United States Patent
Sensui et al.

(10) Patent No.: US 11,529,561 B2
(45) Date of Patent: Dec. 20, 2022

(54) SYSTEMS AND METHODS OF AUTOMATICALLY PERFORMING VIRTUAL TASKS WITHIN A VIDEO GAME

(71) Applicant: NINTENDO CO., LTD., Kyoto (JP)

(72) Inventors: Kazuyoshi Sensui, Kyoto (JP); Masaki Yasuhara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 134 days.

(21) Appl. No.: 17/077,291

(22) Filed: Oct. 22, 2020

(65) Prior Publication Data

US 2021/0146257 A1  May 20, 2021

(30) Foreign Application Priority Data

Nov. 15, 2019 (JP) .............................. JP2019-207018

(51) Int. Cl.
| | | |
|---|---|---|
| A63F 13/69 | (2014.01) | |
| A63F 13/55 | (2014.01) | |
| A63F 13/85 | (2014.01) | |
| A63F 13/44 | (2014.01) | |
| A63F 13/56 | (2014.01) | |
| A63F 13/847 | (2014.01) | |
| A63F 13/822 | (2014.01) | |

(52) U.S. Cl.
CPC .............. *A63F 13/69* (2014.09); *A63F 13/55* (2014.09); *A63F 13/85* (2014.09)

(58) Field of Classification Search
None
See application file for complete search history.

(56) References Cited

U.S. PATENT DOCUMENTS

2019/0118093 A1* 4/2019 Sensui ................... A63F 13/58

OTHER PUBLICATIONS

Partial translation of "Animal Crossing Pocket Camp" has been updated. A lot of new items such as "Blathers's expedition Sugoroku (board game played with dice)" and "Pete's door-to-door delivery" have been added!, [online] , famitsu.com, [searched on Oct. 29, 2019] , Internet (URL : https://www.famitsu.com/news/201901/30171221.html) , 7 pages.

Partial Translation of "[Pocket Camp] How to efficiently clear requests, strategy for awesome game" [online], Feb. 27, 2019 Internet <URL:https://kamigame.jp/どうぶつの森アプリ/攻略ガイド/おねがい.html>, [searched on Jul. 20, 2021], 9 pgs.

(Continued)

*Primary Examiner* — Robert T Clarke, Jr.
(74) *Attorney, Agent, or Firm* — Nixon & Vanderhye P.C.

(57) ABSTRACT

A computer is caused to: manage an item possessed by a player or a player character; and manage a state of a game task an achievement condition of which is that the item is handed over to a non-player character in the game and which is set so as to be associated with each non-player character; and switch a state of the game between a first mode and a second mode, based on a switching input. In the first mode, while the game is played, the computer is caused to achieve a game task, under a condition that the number of the items possessed is changed by a first change amount, based on an operation input by the player. In the second mode, even while the game is not played by the player, the computer is caused to achieve the game task without changing the number of the items possessed.

22 Claims, 11 Drawing Sheets

(56) References Cited

OTHER PUBLICATIONS

Partial Translation of "The Crew Strategic Content" (Way Back Machine) [online] Jan. 2, 2015, Internet <URL:https://web.archive.org/web/20150102213413/https://www.ubisoft.co.jp/crew/special/guide.html, [searched on Jul. 20, 2021], 3 pages.

Partial Translation of "How to use Pete's delivery service, and merits thereof" [online], Feb. 27, 2019, Internet URL:https://kamigame.jp/どうぶつの森アプリ/攻略ガイド/ペリおの宅配便.html, [searched on Jul. 20, 2021], 8 pages.

* cited by examiner

Fig. 9

| CREATION DAY AND TIME | NPC INFORMATION | PROGRESS STATUS | ACHIEVEMENT REWARD INFORMATION | TASK CONTENT INFORMATION |
|---|---|---|---|---|
| yymmdd hhmmss | NPC−A | ORDER NOT RECEIVED | REWARD TABLE A | ... |
| yymmdd hhmmss | NPC−B | IN PROGRESS | REWARD TABLE B | ... |
| yymmdd hhmmss | NPC−C | ACHIEVED | REWARD TABLE C | ... |
| yymmdd hhmmss | NPC−F | IN PROGRESS | REWARD TABLE F | ... |
| yymmdd hhmmss | NPC−H | ORDER NOT RECEIVED | REWARD TABLE H | ... |

Fig. 10

| NPC INFORMATION | USE REWARD TABLE INFORMATION | AUTOMATIC SUBSTITUTION DAY AND TIME |
|---|---|---|
| NPC−A | REWARD TABLE A | yymmdd hhmmss |
| NPC−C | REWARD TABLE C | yymmdd hhmmss |
| NPC−F | REWARD TABLE F | yymmdd hhmmss |
| ⋮ | ⋮ | ⋮ |
| NPC−D | REWARD TABLE D | yymmdd hhmmss |

Fig. 11

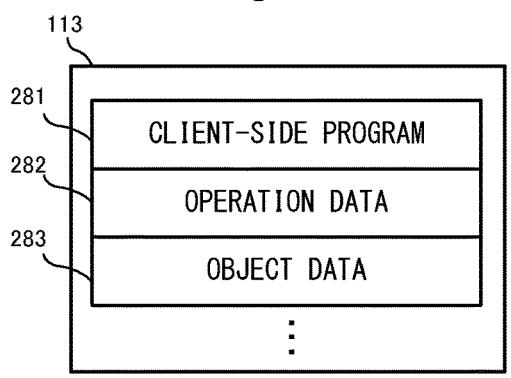

SYSTEMS AND METHODS OF AUTOMATICALLY PERFORMING VIRTUAL TASKS WITHIN A VIDEO GAME

CROSS REFERENCE TO RELATED APPLICATION

The disclosure of Japanese patent Application No. 2019-207018, filed on Nov. 15, 2019, is incorporated herein by reference.

FIELD

The exemplary embodiments relate to information processing in which game processing for presenting a predetermined game task to a player is executed.

BACKGROUND AND SUMMARY

Hitherto, a game in which, when a player character talks to an NPC (non-player character) in the game, a game task also referred to as a "request", a "quest", or the like is issued, and the player character is operated to achieve the game task to acquire a reward, has been known. As such a game task, a game task that can be achieved by, in response to "please bring me an item A" from an NPC, handing over a predetermined item to the NPC, is also known. In order to achieve such a game task, a player needs to perform, by operating a player character, operations of: causing the player character to acquire or obtain a predetermined item in a virtual game world; moving the player character to the place of the NPC who is the requester (causing the player character to meet the NPC); and causing the item to be handed over to the NPC.

Here, a game system in which, instead of a player character directly meeting an NPC and handing over a predetermined item as described above, an instruction is given to a specific NPC, thereby causing the specific NPC, instead of the player character, to deliver the predetermined item to an NPC who is the requester, is also known.

The above game system has room for further improvement in that convenience for the player for achieving the game task is further increased.

Therefore, an object of the exemplary embodiments is to provide an information processing program and the like that can further increase convenience for the player when achieving a game task.

In order to attain the object described above, for example, the following configuration examples are exemplified.

An example of the configuration example is a computer readable non-transitory storage medium having stored therein an information processing program to be executed by a computer of an information processing apparatus, and causes the computer to execute the following processes. As used herein, the computer readable non-transitory storage medium includes, for example, a flash memory, a magnetic medium such as ROM or RAM, an optical medium such as CD-ROM, DVD-ROM, or DVD-RAM. The computer is caused to: manage an item possessed by a player of a game or a player character of the game; manage a state of a game task set in the game; switch a state of the game between a first mode and a second mode on the basis of a switching input by the player; in a case where the state of the game is in the first mode, while the game is played by the player, execute a first determination of determining that, on the basis of an operation input by the player performed in order to achieve a game task that has not been achieved, the game task has been achieved, under a condition that the number of the item possessed is changed by a first change amount; and in a case where the state of the game is in the second mode, even while the game is not played by the player, execute a second determination of determining that the game task has been achieved, under a condition that the number of the item possessed is not changed or the number of the item possessed is changed by a second change amount that is smaller than the first change amount.

According to the above configuration example, in the first mode, the player can achieve a game task on the basis of an operation performed by the player, and in the second mode, even while the player is not playing the game, i.e., even while the player is not performing an operation, a game task can be achieved. In the first mode, the achievement condition is that the number of the items possessed is changed by the first change amount, whereas, in the second mode, said change is not caused, or even when said change is caused, the change amount is smaller than that in the first mode. Therefore, the game task can be performed without an operation by the player, and in addition, when the game task is achieved in the second mode, a decrease, in the number of the items possessed, that is not intended by player can be prevented or alleviated. Accordingly, convenience for the player when trying to achieve a game task can be improved. Further, the content of the game task can be changed for each non-player character, and motivation for meeting various non-player characters in the game can be provided.

As another configuration example, in the second achievement determination, among the game tasks that are able to be determined as having been achieved in the first achievement determination or the second achievement determination, a game task that has not been determined as having been achieved in the first achievement determination, may be determined as having been achieved.

According to the above configuration example, game tasks that have been achieved through operations by the player can be excluded from the processing targets for the second achievement determination. Accordingly, a feeling of strangeness caused when a game task having been achieved in accordance with the first achievement determination is achieved in accordance with the second achievement determination can be prevented from being given to the player.

As still another configuration example, in the second achievement determination, among the game tasks that are able to be determined as having been achieved in the first achievement determination or the second achievement determination, all of game tasks that have not been determined as having been achieved in the first achievement determination, may be determined as having been achieved.

According to the above configuration example, all of game tasks that have not been achieved through operations by the player can be considered as having been achieved in the second achievement determination. Thus, convenience for the player can be improved.

As still another configuration example, the game task may be updated in accordance with a lapse of in-game time or a lapse of real time.

According to the above configuration example, the content of the game task can be periodically updated every predetermined time period. Accordingly, various game tasks can be provided to the player, and the game can be enjoyed for a long time.

As still another configuration example, in the second achievement determination, in accordance with a fact that update of the game task has been performed, the game task before the update may be determined as having been achieved.

According to the above configuration example, the game task can be periodically considered as having been achieved.

As still another configuration example, in the second achievement determination, at a time of start of the game, the game tasks of which the number corresponds to a lapse of real time after playing of the game has been ended in an immediately preceding time may be determined as having been achieved.

According to the above configuration example, since processes of achieving game tasks are collectively performed at the time of the start of the game, the processes can be more efficiently performed when compared with the processes being periodically performed.

As still another configuration example, the information processing program may further cause the computer to: designate at least one non-player character out of a plurality of the non-player characters; execute a game representation indicating that the designated non-player character achieves the game task instead of the player or the player character; and set, in state management of the game tasks, a game task so as to be associated with each non-player character excluding the designated non-player character.

According to the above configuration example, it is possible to present a representation indicating that the designated non-player character achieves a game task instead of the player. In addition, a game task can be prevented from being presented from the designated non-player character. Accordingly, a representation that would not cause a feeling of strangeness to the player can be realized.

As still another configuration example, in the second achievement determination, when designation of the non-player character has been performed for the first time, that at least one of the game tasks has been achieved in accordance with the designation may be determined, and in the execution of the game representation, the game representation for the game task having been achieved in accordance with the designation made for the first time may be executed.

According to the above configuration example, how the non-player character achieves a game task instead of the player can be indicated as a demonstration to the player. Thus, usefulness of the process according to the second achievement determination can be shown to the player in an easily understandable manner.

As still another configuration example, under a condition that the player or the player character possesses a specific item, a non-player character corresponding to the specific item may be allowed to be designated.

According to the above configuration example, it is possible to provide the player with a motivation for acquiring various items in the game in order to increase the number of non-player characters that can be designated. Thus, entertainment characteristics of the game can be improved.

As still another configuration example, the information processing program may further cause the computer to give a reward to the player or the player character on the basis of a fact that the game task has been achieved.

According to the above configuration example, it is possible to provide the player with a motivation for actively achieving game tasks.

As still another configuration example, in the giving of the reward, an item obtainable in the game by the player or the player character at a time point of giving the reward based on the fact that the game task has been achieved in accordance with the second achievement determination, may be further given to the player or the player character.

According to the above configuration example, it is possible to omit the work of acquiring an item in the game through an operation by the player, and it is also possible to provide the player with a motivation for using the function of the second achievement determination.

As still another configuration example, in the second achievement determination, in a case where the state of the game is in the second mode, and update of the game task has been performed while the game is played by the player, the game task may be determined as having been achieved, when transition of a screen of the game is performed after the update.

According to the above configuration example, it is possible to reduce the possibility that a feeling of strangeness due to an unachieved game task being achieved at the same time of update of a task is given to the player. For example, in a case where a process according to the second achievement determination is realized through a control in which a non-player character near the player character achieves an unachieved game task, a feeling of strangeness that the unachieved game task has been achieved although the non-player character is nearby can be prevented from being given to the player. That is, at a timing, such as a scene transition in the game, when the non-player character is not displayed on the screen, the scene can be displayed as if the non-player character has just achieved a game task that has not been achieved.

As still another configuration example, the information processing program may further cause the computer to generate, on the basis of a confirmation operation input by the player, an image that allows confirmation of the game task achieved after the confirmation operation input has been performed at an immediately preceding time.

According to the above configuration example, the player can grasp a game task that has been achieved while the player does not notice, and convenience for the player can be improved.

As still another configuration example, in state management of the game tasks, each game task may be updated in accordance with a lapse of in-game time or a lapse of real time, and in the second achievement determination, when the game task has been updated in a state where the confirmation operation input for confirming the game task achieved has not been performed, the game task may be, also with respect to the updated game task, determined as having been achieved, under a condition that the number of the item possessed is not changed or the number of the item possessed is changed by the second change amount that is smaller than the first change amount.

According to above configuration example, even when game tasks are updated for a plurality of times while the player is not playing the game (e.g., during log out period), these game tasks can be used as processing targets for the second achievement determination. Accordingly, convenience for the player can be improved.

As still another configuration example, in the second achievement determination, a process of determining that, when the game task has been updated in a state where the confirmation operation input has not been performed, the updated game task has been achieved, may be repeatedly executed, with a predetermined number of times set as an upper limit number of times, and a count of the number of times of execution of the determination may be reset in accordance with a fact that the confirmation operation input has been performed.

According to the above configuration example, it is possible to reduce the storage capacity for storing information of game tasks achieved in accordance with the second achievement determination before a confirmation operation is performed.

As still another configuration example, the information processing program may further cause the computer: when the game task has been determined as having been achieved in the first achievement determination, to change, by a third change amount, a non-player-related parameter that corresponds to the non-player character associated with the game task; and when the game task has been determined as having been achieved in the second achievement determination, not to change the non-player-related parameter, or to change the non-player-related parameter by a fourth change amount that is smaller than the third change amount.

According to the above configuration example, for example, in a case where a parameter of a degree of intimacy is set for a non-player character, when a game task is achieved in accordance with the first achievement determination, the degree of intimacy with the non-player character related to the game task can be increased. Meanwhile, when a game task is achieved in accordance with the second achievement determination, the increase in the degree of intimacy may be made less sharp than in the case of the first achievement determination. Accordingly, it is possible to provide the player with a motivation for performing achievement of a game task in accordance with the first achievement determination, and to provide the player with room for selectively using the first achievement determination and the second achievement determination, whereby entertainment characteristics of the game can be increased.

As still another configuration example, the information processing program may further cause the computer to: designate at least one non-player character out of a plurality of the non-player characters; execute a game representation indicating that the designated non-player character achieves a game task instead of the player or the player character; and change, when the game task has been determined as having been achieved in the second achievement determination, the non-player-related parameter associated with the designated non-player character.

According to the above configuration example, for example, in a case where a parameter of a degree of intimacy is set for a non-player character, when a game task has been achieved as a result of the second achievement determination, the degree of intimacy with the designated non-player character can be increased.

As still another configuration example, the state according to the first mode is a standard state of the game, and under a condition that the player or the player character pays a consideration, the first mode may be switched to the second mode.

As still another configuration example, under a condition that a right that has become effective as a result of the player or the player character paying a consideration is valid, the first mode may be switched to the second mode.

According to the exemplary embodiment, convenience for the player to achieve a game task can be increased.

BRIEF DESCRIPTION OF THE DRAWINGS

FIG. 9 illustrates a non-limiting example of a configuration of existing-task data 224;

FIG. 10 illustrates a non-limiting example of a data configuration of automatic substitution result data 225;

FIG. 11 illustrates a non-limiting example of a program and data stored in a memory 113 of the smart device 102;

DETAILED DESCRIPTION OF NON-LIMITING EXAMPLE EMBODIMENTS

Figure 1:
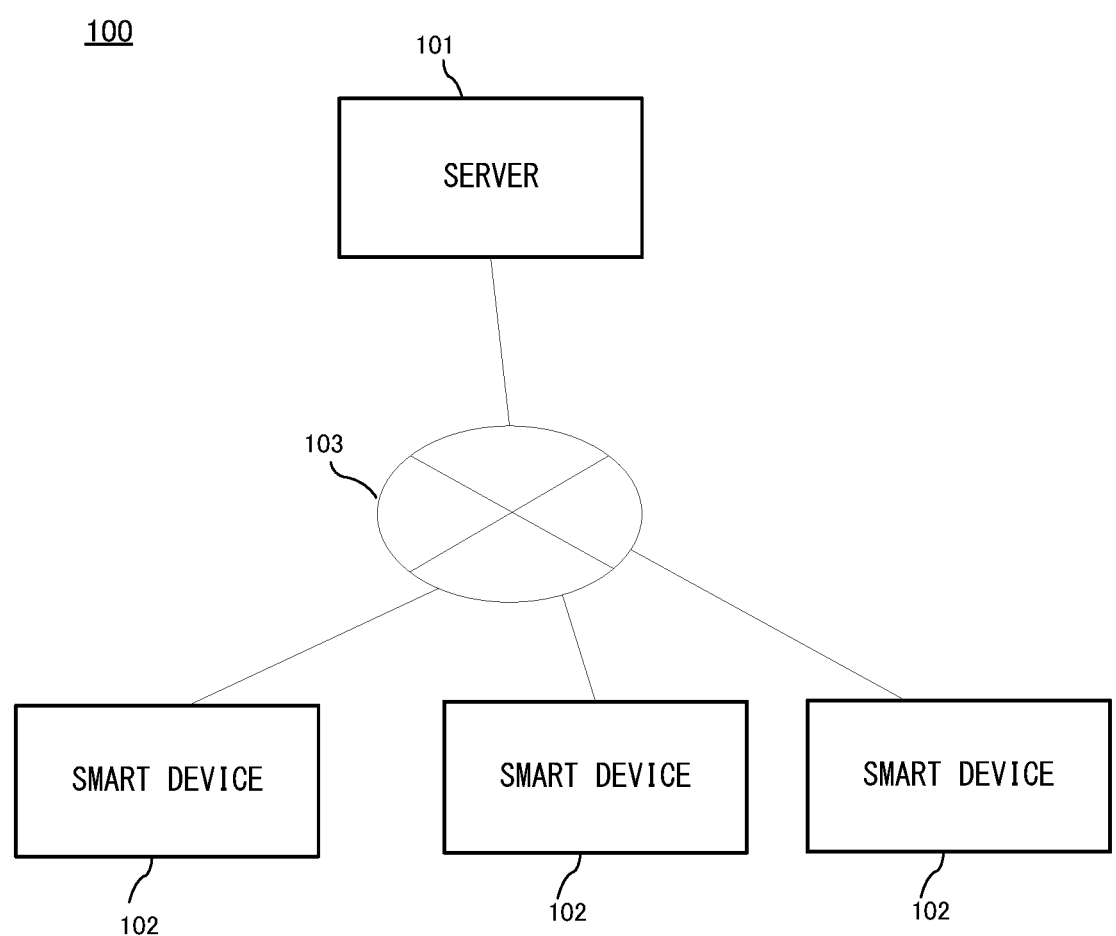
FIG. 1 is a schematic diagram showing a non-limiting example of an overall image of an information processing system according to an exemplary embodiment.

Hereinafter, one exemplary embodiment will be described. It is to be understood that, as used herein, elements and the like written in the singular form with the word "a" or "an" attached before them do not exclude those in the plural form. FIG. 1 is a schematic diagram showing an overall image of an information processing system according to the exemplary embodiment. An information processing system 100 of the exemplary embodiment includes a server 101 and a plurality of terminals 102. In the exemplary embodiment, a smart device is assumed as an example of the terminal 102. In the exemplary embodiment, a hand-held information processing terminal such as a smartphone or a tablet apparatus is assumed as an example of the smart device 102. However, the processing of the exemplary embodiment can be applied to stationary smart devices. The server 101 and the smart devices 102 are configured so as to be communicable with each other via the internet 103.

In the exemplary embodiment, information processing is executed in the configuration as described above. In the following, as an example of the information processing, game processing is described as an example Specifically, a game program is installed in each smart device, and the game processing is executed while the smart device communicates with the server 101 as appropriate. In the game processing according to the exemplary embodiment, the data itself indicating the play status of a player is stored in the server 101. The data indicating the play status is, for example, information of a player character operated by the player, the progress status of a game task described later, or data indicating a possessed item and the like, and is, for example, player data 213 described later. For example, a process of logging in the server 101 is executed at the start of the game, data indicating the play status of the player is obtained from the server 101 onto the smart device 102, and the game processing is executed by using the data.

[Hardware Configuration of Server]

Figure 3:
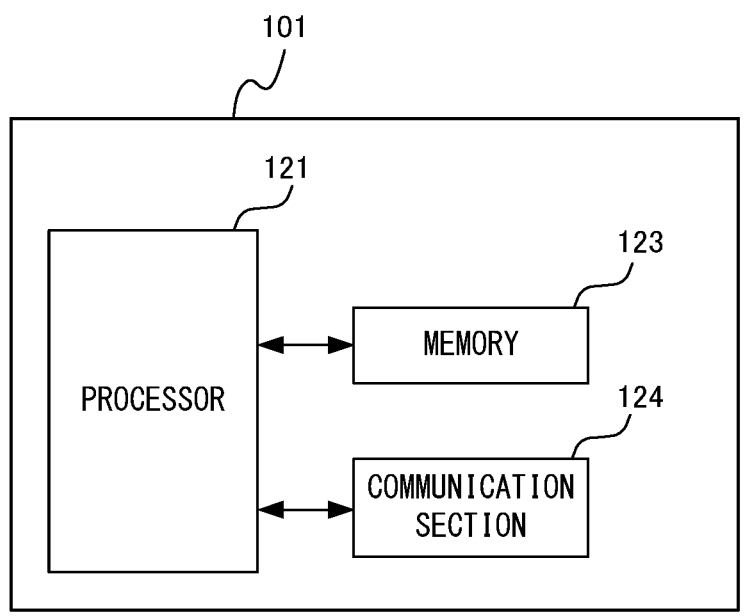
FIG. 3 is a block diagram showing a non-limiting example of a configuration of a server 101.

Next, a hardware configuration of the server 101 is described. FIG. 3 is a functional block diagram of the server 101. The server 101 includes at least a processor 121, a memory 123, and a communication section 124. The processor 121 executes various kinds of programs for controlling the server 101. Various kinds of programs to be executed and various kinds of data to be used by the processor 121 are stored in the memory 123. The communication section 124 is connected to a network through wired or wireless communication, and transmits/receives predetermined data to/from the smart devices 102 or another server (not shown).

[Hardware Configuration of Smart Device]

Figure 2:
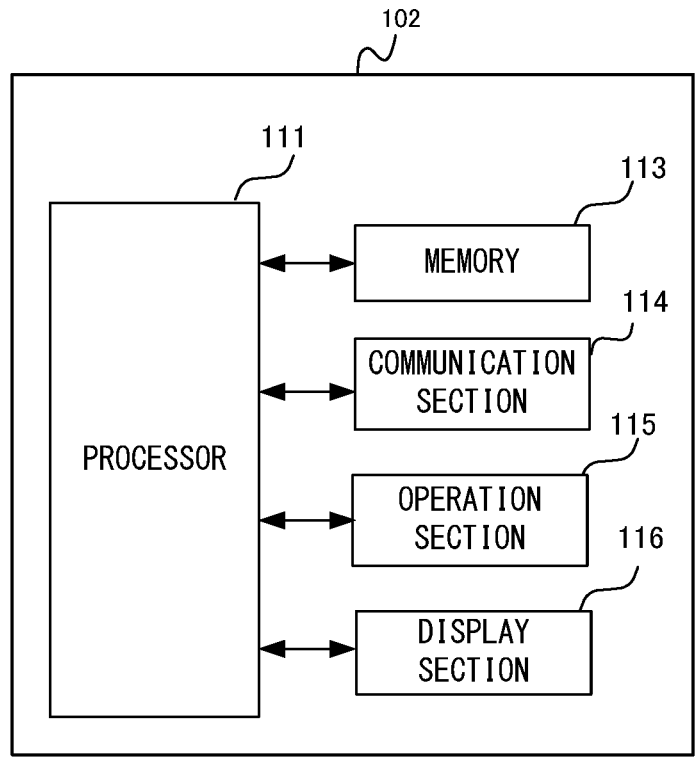
FIG. 2 is a block diagram showing a non-limiting example of a configuration of a smart device 102.

Next, configurations of hardware in the above system are described. FIG. 2 is a functional block diagram of the smart device 102. In FIG. 2, the smart device 102 includes a processor 111, a memory 113, a communication section 114, an operation section 115, and a display section 116. The processor 111 controls operation of the smart device 102 by executing information processing described later, or by executing a system program (not shown) for controlling overall operation of the smart device 102. The processor 111 may include a single processor or a plurality of processors. Various kinds of programs to be executed by the processor 111 and various kinds of data to be used in the programs are stored in the memory 113. The memory 113 is, for example, a flash EEPROM or a hard disk device. The communication section 114 is connected to a network through wired or wireless communication, and transmits/receives predetermined data to/from the server 101. The operation section 115 is, for example, an input device for receiving an operation from a user. The display section 116 is typically a liquid crystal display device. In the processing according to the exemplary embodiment, a touch panel integrated with a liquid crystal screen is assumed as the operation section 115 and the display section 116. In another exemplary embodiment, a predetermined pointing device other than a touch panel may be used as the operation section 115.

[Outline of Game Processing According to Exemplary Embodiment]

Next, the outline of information processing executed in the exemplary embodiment will be described. In the exemplary embodiment, game processing is described as an example of the information processing. In particular, the exemplary embodiment relates to a process of receiving an order of a game task presented in the game, achieving the game task, and acquiring a predetermined reward.

First, the game assumed in the exemplary embodiment is a game in which the player virtually lives as a player character in a virtual game world where various virtual characters live. For example, the player character can collect various material items to build an own house, and can perform maintenance of a garden. In this game, when the player character talks to a predetermined virtual character (hereinafter, referred to as an "NPC" (non-player character)), a game task is presented by the NPC. By achieving this game task, the player character can acquire a predetermined reward. In this game, a parameter indicating the degree of intimacy with the player character (hereinafter, simply referred to as "degree of intimacy") is set for each NPC. By achieving such a game task, it is also possible to increase the degree of intimacy with the NPC that has presented the game task. By increasing the degree of intimacy, it is also possible to obtain a special item or the like from the NPC.

The above-described game task is a so-called quest, request, mission, or the like. In this example, as the game task, a game task in which a predetermined item is requested by an NPC is assumed. For example, when the player causes the player character to talk to a predetermined NPC, an indication, as a game task, that requests the player character to bring a predetermined item is presented by the NPC. The player can select whether or not to undertake this game task (hereinafter, undertaking a game task is referred to as "receive an order" or "order reception"). When having received an order of the game task, the player can then acquire the requested item in the virtual game world by operating the player character, and can hand over the acquired item to the NPC. Accordingly, the game task is achieved, and an achievement reward can be acquired. In other words, a game task in which consuming a predetermined item possessed by the player character is set as an achievement condition, is described as an example. In this example, as for the game task, different contents are set for respective NPCs.

More specifically, in this game, a plurality of virtual characters, which are personified animals, are set as NPCs. When a player character (which is a human character) talks to a predetermined NPC, a "request" message indicating, for example, "please bring me an apple and three peaches" is displayed. This is the presentation of a game task associated with the NPC. That is, an item (hereinafter, referred to as a "request item", which is a concept also including a required number of the item) required for achieving the game task is presented. At this time, choices of whether or not to receive an order of this game task are displayed to the player. When the player performs an operation of selecting receiving an order of the game task, a state where the order of the game task has been received is established. Thereafter, the player operates the player character to move to a predetermined place (as an example, a forest where fruits are on a tree) in the game where apples and peaches can be acquired. By performing an operation (for example, an operation of shaking a tree) for acquiring apples and peaches, it is possible to acquire a predetermined number of apples and peaches. In other words, the number of possessed items of the player character is increased. Then, when the player character is moved to the place where the NPC is present, and talks to the NPC, the player character can hand over the request item to the NPC. That is, from the items possessed by the player character, one apple and three peaches are consumed. Accordingly, the game task is achieved, and as an achievement reward, a predetermined in-game item is given to the player (or the player character). In addition, the degree of intimacy with the NPC is also increased.

In a case where the player character already possesses the above request item at the time point of receiving an order of the game task, the game task can be achieved at the same time as the reception of the order of the game task.

Here, the timing of occurrence of the game task in this game is supplementarily described. In this game, a game task is set for each NPC, and an order can be received from each NPC. These NPCs appear at predetermined places in the game world at timings determined in advance, and then disappear at predetermined timings. Therefore, the predetermined timing is also a timing (hereinafter, referred to as a "task update timing") at which a game task of which an order can be received is updated. In a specific example, it is assumed that five places are defined in advance as in-game places at each of which an NPC that presents a game task appears. In addition, it is assumed that the NPC that appears is changed every three hours. For example, it is assumed that, as NPC appearance places, five places of "place A" to "place E" have been defined. In addition, it is assumed that ten NPCs of "NPC-A" to "NPC-J" have been prepared as NPCs that can present game tasks (these specific numerical values are merely examples). When NPC-A appears at, for example, 3:00 at place A, a state where an order of "game task A" can be received from NPC-A is established. Then, at 6:00, NPC-A disappears from place A, and NPC-F appears. From NPC-F, an order of "game task F" can be received. That is, at the timing of 6:00, the game task of which an order can be received at place A is updated from "game task A" to "game task F".

With respect to a game task of which an order has been received but the task update timing has arrived before the game task is achieved, it is considered that, in this example, the game task has not been achieved unless automatic execution by a substitute described later has been performed.

In this example, for easier description, it is assumed that one game task is set for one NPC. However, in another exemplary embodiment, orders of a plurality of game tasks may be received from one NPC. For example, with respect to NPC-A, three game tasks of "game task A1", "game task A2", and "game task A3" may be set. In this case, when "game task A1" has been achieved, an order of "game task A2" may become able to be received. Similarly, when "game task A2" has been achieved, an order of "game task A3" may become able to be received.

Thus, in this game, five game tasks (five NPCs) are changed every three hours, and the player can receive orders of a maximum of five game tasks (the player can keep orders). Since eight updates of the game task are performed per day, the player can receive orders of a maximum of 40 game tasks per day.

As described above, in this game, in order to achieve a game task, basically, game operations need to be performed in the flow as below.

(1) operation for receiving an order of a game task from an NPC (hereinafter, referred to as an "order reception operation")➔ (2) various kinds of operations for collecting a request item➔ (3) an operation for handing over the request item to the NPC (hereinafter, referred to as a "request item handing-over operation").

In order to achieve one game task, a series of operations as described above are required (this can be said as having a kind of routine-work characteristic). Here, when all of the game tasks updated every three hours as described above are to be achieved, a certain level of effort of operations by the player could be required. Even if not all, when some game tasks are wished to be achieved, there may be cases where sufficient play time cannot be secured due to time schedules or the like of the player, and game tasks could not be achieved as desired. Therefore, in the exemplary embodiment, a function for automatically achieving the game tasks as described above is provided. Specifically, in this game, a "partner character" is used to realize this function.

More specifically, the player can set (designate) one of the above-described virtual characters as a "partner character" (hereinafter, simply referred to as a "partner"). The set partner is controlled so as to follow the player character in the game while the partner is set. When the partner is set, the partner acting as a substitute automatically executes the game task, instead of the player (in the game, the partner "helps" the player). Accordingly, even when the player does not perform the series of operations as described above, the partner achieves the game task instead. While the partner is set, even when the player is not playing the game (while the player has not logged in, etc.), a process in which the partner acting as a substitute automatically executes the game task is performed. Therefore, if the partner is set, game tasks that could occur in a time period in which the player has not logged in the game can be achieved by the partner, and achievement rewards thereof can be acquired.

In the exemplary embodiment, the virtual character set as the partner does not present a game task while the virtual character is set as such. Thus, while the partner is set, a virtual character other than the partner presents a game task.

Target game tasks that are to be automatically executed by the partner acting as a substitute are, among game tasks having occurred at the task update timing described above, all of game tasks that have not been achieved at that task update timing. For example, a case where orders of a total of five game tasks have become able to be received at a task update timing of 6:00, and then, only two game tasks have been achieved before the next task update timing of 9:00, is assumed. In this case, a process is performed in which: at the timing of 9:00, the remaining three game tasks are automatically executed by the partner acting as a substitute and the game tasks are updated. In other words, game tasks that have been achieved by the player are not targets to be automatically executed by a substitute. In this example, game tasks of which orders have been received but that have not been achieved at a task update timing are also targets to be automatically executed by a substitute. In another exemplary embodiment, game tasks of which orders have been received but a game task update timing has arrived before the game tasks have been achieved may be handled as "not having been achieved", without being set as targets to be automatically executed by a substitute. In still another exemplary embodiment, not all the game tasks that have not been achieved are set as targets to be automatically executed by a substitute, and instead, only a part thereof may be set as targets to be automatically executed by a substitute.

Here, in the exemplary embodiment, when a game task is achieved by the partner above, a request item as described above is not consumed. For example, in a case where the request item of game task A is "one apple and three peaches", when the player achieves this game task A by performing a series of operations as described above, not through automatic execution by the partner acting as a substitute, "one apple and three peaches" are consumed from the possessed items. However, when the game task A has been achieved by being automatically executed by the partner acting as a substitute, such consumption from the possessed items is not made. This is to prevent a request item from being handed over to an NPC without being noticed by the player, since a game task can be achieved without requiring operations by the player in the case of automatic execution by a substitute. That is, this is to prevent occurrence of consumption of items or decrease in the number of possessed items that is not intended by the player.

Next, the timing when automatic execution by a partner acting as a substitute is conducted, and giving an achievement reward are described. Here, a case where the game has been started, and a case where the game has not been started (a case where the player is not playing the game) are separately described. First, in a case where the game has been started (when the player is playing the game), a process in which a game task that has not been achieved at the above-described task update timing is automatically executed by a substitute and achieved, is performed at that task update timing. However, in actuality, an achievement reward is not given at the same time as the task update timing, but is given at a timing when a report screen described later is confirmed by the player.

Meanwhile, in the game, automatic execution by a substitute while the game is not started is expressed as: the game task has been achieved by the partner also while the game has not been started. This is realized by a process as below. In this example, at the timing when the game is resumed, it is considered that the automatic execution by a substitute has been conducted by the number of task update timings that correspond to the time period having elapsed from the time when save-data has been saved in the immediately preceding time. Specifically, at the timing when the game is resumed, the number of times the automatic execution by a substitute has been conducted while the game has not been started, is calculated, and the calculation result is stored. Then, in a process in which a report screen described later is presented to the player, game tasks corresponding to said number of times are generated, and the game tasks are automatically executed by the partner acting as a substitute. Then, lotteries for achievement rewards corresponding to the game tasks automatically executed by the substitute are also performed, and achievement rewards are given to the player.

As described above, also while the player has not started the game, a process assuming that the automatic execution by a substitute has been conducted is performed. However, a reward is received at the timing when the report screen is confirmed. Thus, unless an operation of confirming the report screen is not performed, the achievement reward is not given to the player and is accumulated. In this example, from the viewpoint of storage capacity reduction and the like, an upper limit is provided to the number of rewards that can be accumulated (in other words, the number of times automatic execution by a substitute can be conducted). Then, when the number of achievement rewards that have not been given reaches this upper limit, a control in which new automatic execution by a substitute is not conducted until a reward is received through confirmation of the report screen, is performed. In this example, this upper limit value is set to the number of rewards that corresponds to one day. Accordingly, when reception of an achievement reward is not performed at least once per day, automatic execution by a substitute is not performed any more. Accordingly, a motivation for starting the game every day can also be provided to the player.

Next, the aforementioned report screen is described. First, when a game task is achieved by being automatically executed by a partner acting as a substitute, a notification or the like indicating that a reward owing to the automatic execution by the substitute can be received, is presented. Then, when the player performs an operation for confirming the content of this notification, a result of the automatic execution by the substitute and an acquired reward are displayed in the form of a "report screen", and the achievement reward is given to the player at this timing.

Figure 4:
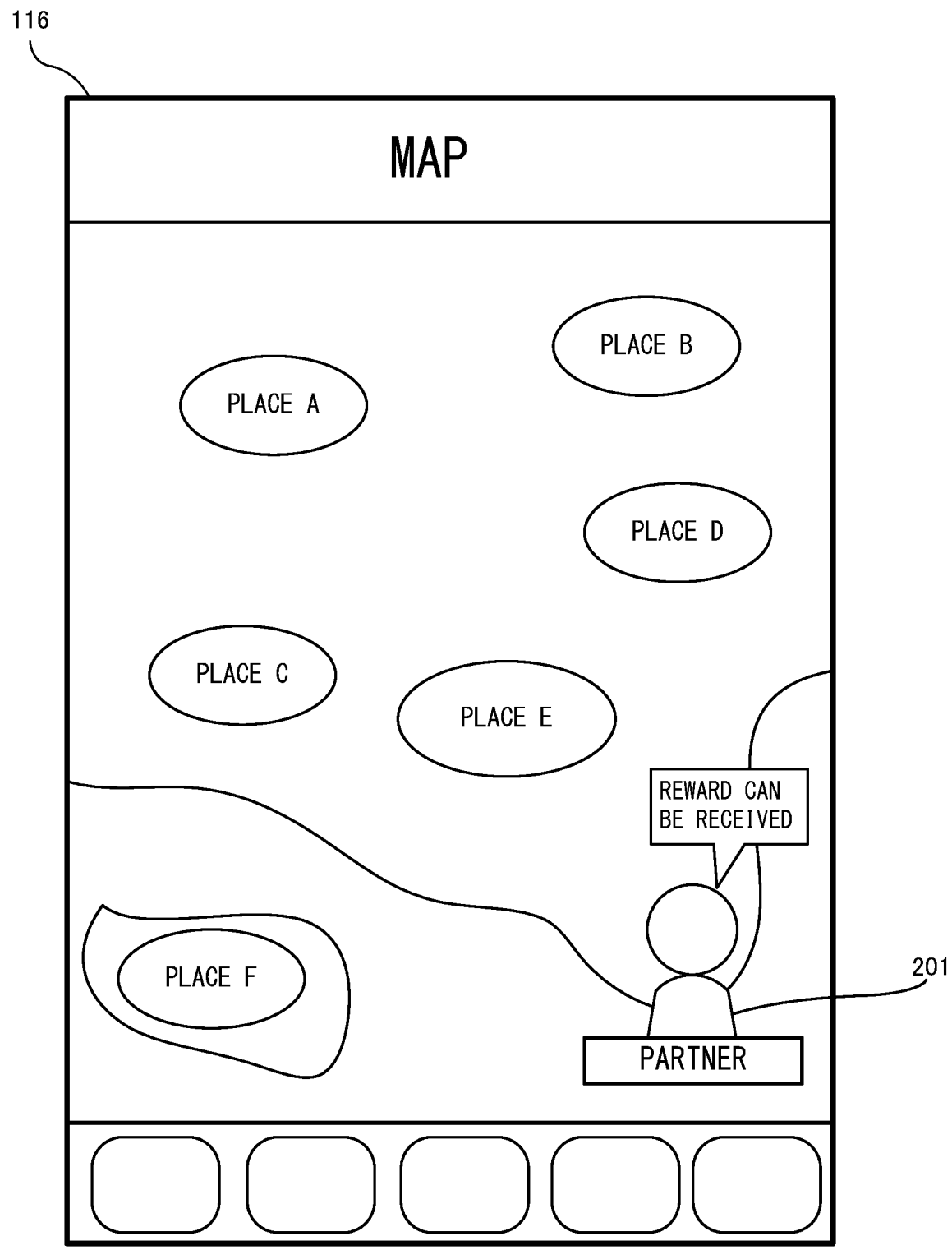
FIG. 4 illustrates a non-limiting example of a screen of a game according to the exemplary embodiment.
Figure 5:
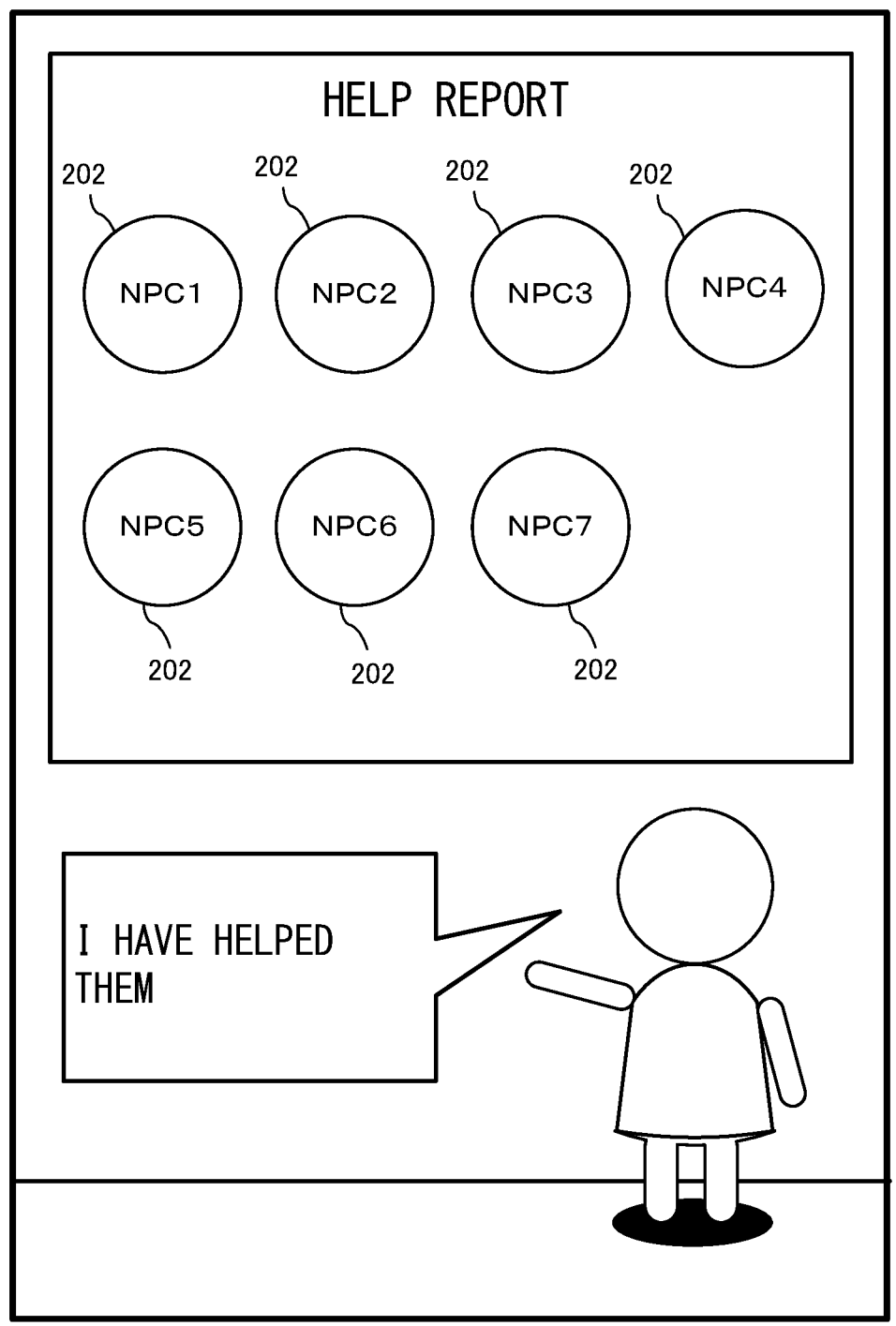
FIG. 5 illustrates a non-limiting example of a screen of the game according to the exemplary embodiment.
Figure 6:
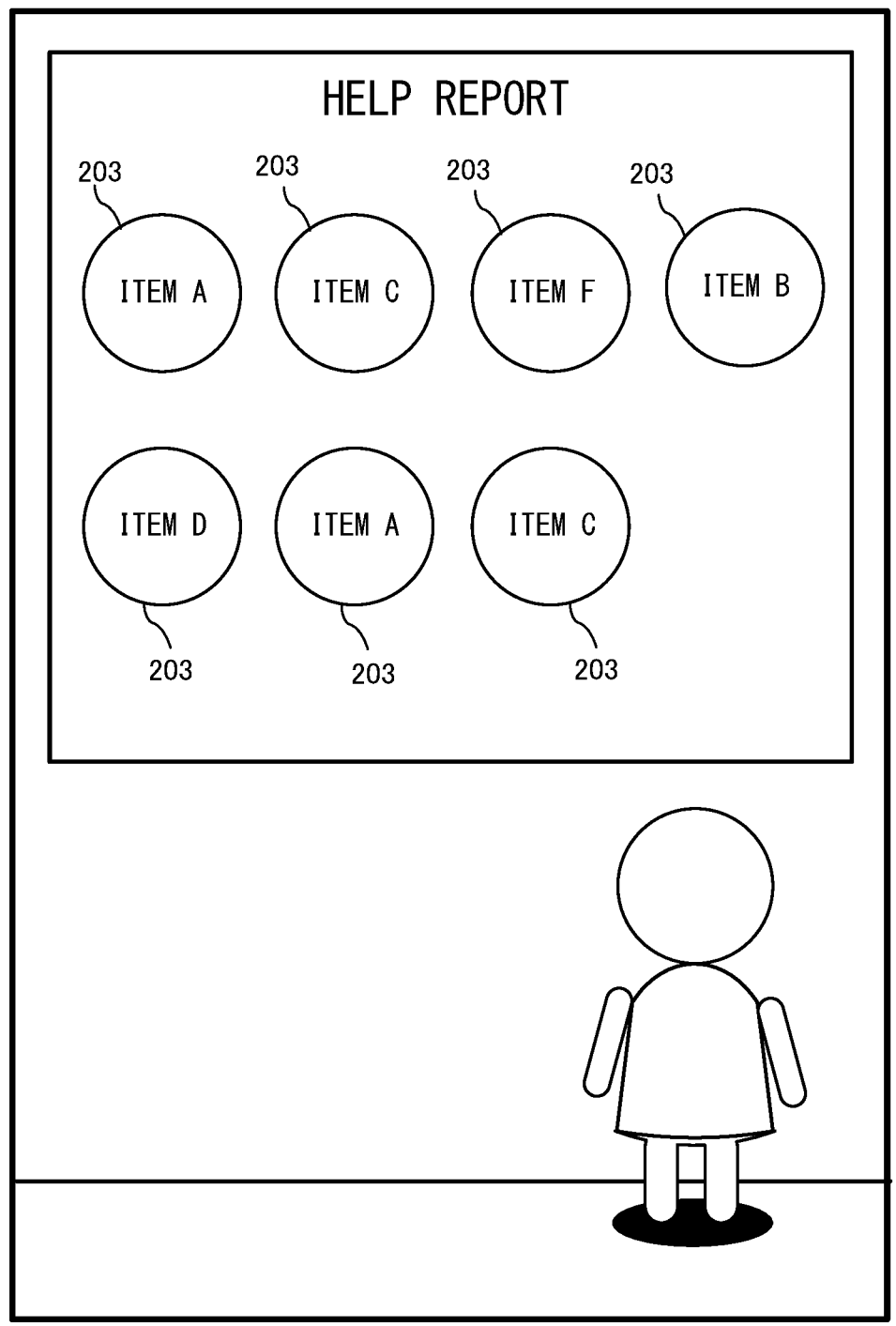
FIG. 6 illustrates a non-limiting example of a screen of the game according to the exemplary embodiment.

In the following, by use of a screen example, examples of the flow of the game and screen transition related to the report screen are described. FIG. 4 to FIG. 6 show examples of a game screen related to the report screen. First, FIG. 4 shows an example of a map screen. A map in a bird's eye view of the virtual game world is displayed on this screen, and a plurality of places to which the player character can move are shown. The player designates (e.g., performs a tapping operation on) a predetermined place, thereby being able to move the player character to that place. On this screen, a partner image 201 is displayed in a lower right portion of the screen. Further, a message that an achievement reward owing to automatic execution by a substitute can be received is also displayed in the form of a spiel by the partner. The player performs a tapping operation on the partner image 201, thereby being able to confirm the result of the automatic execution by the substitute. When the partner image 201 is tapped when there is no receivable reward, a "partner management menu" (not shown) is displayed. From this management menu, the player can, for example, dismiss or change the partner.

When the player performs a tapping operation on the partner image 201, a report screen (NPC list) as shown in FIG. 5 is displayed. On this screen, images 202 (e.g., face image) of NPCs who are requesters of game tasks that have been automatically executed by the partner acting as a substitute (in FIG. 5, expressed as "help") during a period from the immediately preceding confirmation of the result to the present time, are displayed in a list. That is, which NPCs' game tasks have been automatically executed by the substitute is shown.

When the player further performs a tapping operation on (at any position of) the screen shown in FIG. 5, a representation such as reversing the images 202 of the NPCs is performed, and a report screen (reward list) as shown in FIG. 6 is displayed. In FIG. 6, images 203 each showing an achievement reward of a corresponding game task are displayed in a list. Accordingly, the player can confirm which items have been acquired as the achievement rewards. At the timing of confirmation of the report screen, a lottery process for the achievement reward is performed, and a process of giving the player the achievement reward selected through the lottery is also executed.

[Detail of Game Processing of Exemplary Embodiment]

Next, the game processing of the exemplary embodiment is more specifically described with reference to FIG. 7 to FIG. 17.

[Data to be Used]

Figure 7:
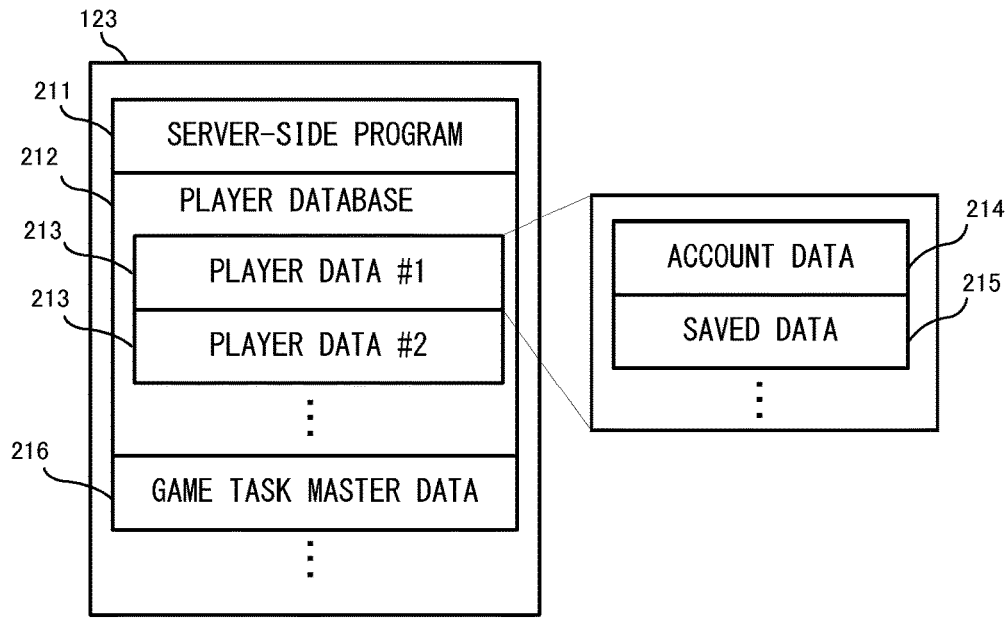
FIG. 7 illustrates a non-limiting example of a program and data to be stored in a memory 123 of the server 101.

First, various kinds of data to be used in this game processing are described. FIG. 7 shows an example of a program and data stored in the memory 123 of the server 101. A server-side program 211, a player database 212, a game task master data 216, and the like are stored in the memory 123.

The server-side program 211 is a program for causing the server 101 to execute various kinds of functions on the server-side in the game processing according to the exemplary embodiment.

The player database 212 is a database that stores information about each player of the game according to the exemplary embodiment, and is composed of a plurality of player data 213. Each player data 213 includes account data 214, saved data 215, and the like.

The account data 214 is information regarding an account of each player, and is information for identifying each player. The account data 214 is also used in a log-in process and the like to the server 101.

Figure 8:
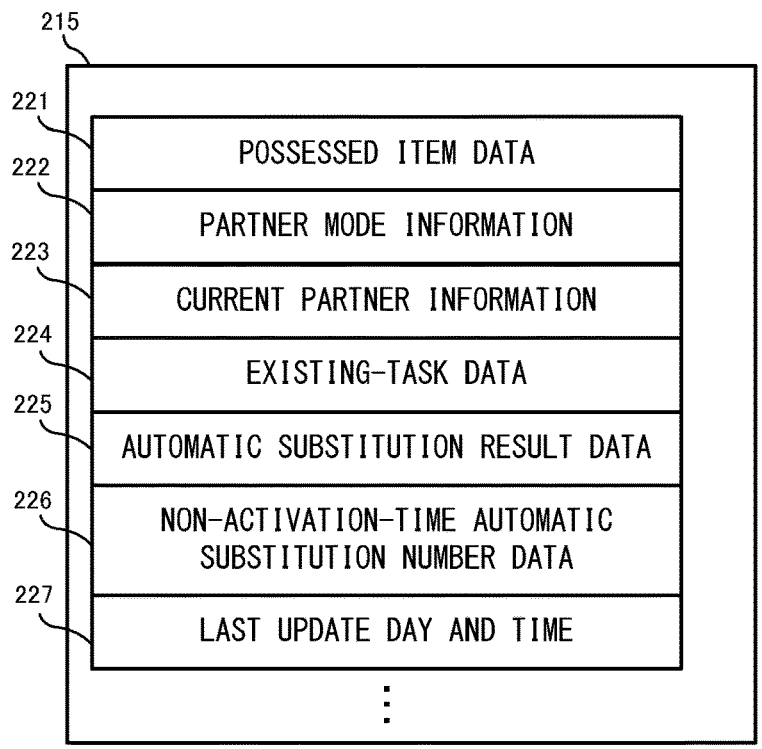
FIG. 8 illustrates a non-limiting example of a configuration of saved data 215.

The saved data 215 is saved information of a play status, a progress status, and the like of the game of each player. FIG. 8 shows an example of a configuration of the saved data 215. The saved data 215 includes possessed item data 221, partner mode information 222, current partner information 223, existing-task data 224, automatic substitution result data 225, non-activation-time automatic substitution number data 226, last update day and time 227, and the like.

The possessed item data 221 is information indicating in-game items possessed by the player. When the above-described request item or the like has been acquired in the game, the acquired request item or the like is stored in the possessed item data 221 once. When a request item is handed over to the requester of a game task, the request item is consumed from or the number of possessions thereof is reduced by subtraction in the possessed item data 221.

The partner mode information 222 is information for indicating whether or not the state is a state where the above-described partner has been set. In the description below, the state where a partner has been set is referred to as a "partner mode", and the state where a partner has not been set is referred to as a "non-partner mode".

The current partner information 223 is information, in the case of the partner mode, for specifying a partner that is currently set. That is, the current partner information 223 is information that indicates whether the virtual character is currently set as a partner.

The existing-task data 224 is information indicating the content of game tasks that currently exist while the player is playing the game. In other words, the existing-task data 224 is information to be used in management of the existing game tasks. As described above, the contents of the game tasks are periodically (in this example, every three hours) changed at task update timings. At the task update timings, the existing-task data 224 is updated as information indicating the contents of the updated game tasks. In this example, the data is updated while the player has started the game (has logged in the game), and the data is not updated while the player has not started the game (has logged out). This is because, in relationship with a process described later, it is necessary to grasp, at the time of resumption of the game, the game tasks that have existed when the player has logged out from the game in the immediately preceding time.

FIG. 9 shows an example of a data configuration of the existing-task data 224. The existing-task data 224 is table-formatted data that includes, at least, creation day and time 251, NPC information 252, progress status 253, achievement reward information 254, and task content information 255. In FIG. 9, one record (data corresponding to one horizontal row) in the existing-task data 224 corresponds to one game task. In this example, an example in which five game tasks occur every single task update timing is described. Thus, the number of pieces of the existing-task data 224 is also 5. The creation day and time 251 is information indicating the day and time at which the game tasks have been generated (have occurred). The NPC information 252 is information for specifying an NPC that is the requester of the game task in the record. The progress status 253 is information indicating the progress status of the game task. This information has set therein, as appropriate, information that indicates: "order not received" indicating a state where an order has not been received; "in progress" indicating a state where an order has been received but the game task has not been achieved; or "achieved" indicating a state there the game task has already been achieved. The achievement reward information 254 is information for indicating an achievement reward for the game task. Here, in the exemplary embodiment, the achievement reward is selected through a lottery. Thus, information indicating a lottery table to be used in the lottery is defined in the achievement reward information 254. In this example, at the timing when an operation of receiving an achievement reward is performed, a lottery process using the lottery table is performed, and a reward content is determined. The task content information 255 is information indicating the content of the game task. For example, the task content information 255 includes information and the like that define the content of the request item.

With reference back to FIG. 8, next, the automatic substitution result data 225 is data for indicating a result of the above-described automatic execution by a substitute conducted while the game has been started. More accurately, the automatic substitution result data 225 is information that indicates a game task of which the achievement reward has not been received by the player although the game task itself is considered as having been achieved by the automatic execution by the substitute. In other words, the automatic substitution result data 225 is information that indicates the achievement reward having not been received and the game task corresponding thereto. In the exemplary embodiment, an upper limit is provided to the number of pieces of the automatic substitution result data 225. In this example, as described above, an example case where the upper limit is 40, i.e., corresponding to one day, is described (task update every three hours is performed eight times). That is, unless achievement reward reception is performed, the upper limit of the number of times of the process for automatic execution by a substitute is 40. Accordingly, achievement rewards owing to the automatic execution by the substitute can only be accumulated up to those corresponding to one day at maximum. Since the upper limit is provided, the storage capacity for storing information about which NPCs have been met in the past and orders of what game tasks have been received, can be reduced.

FIG. 10 shows an example of a data configuration of the automatic substitution result data 225. The automatic substitution result data 225 is table-formatted data that includes, at least, NPC information 261, use reward table information 262, and automatic substitution day and time 263. One record in the automatic substitution result data 225 corresponds to one game task. As described above, in this example, automatic substitutions corresponding to one day is set as the upper limit. Thus, 40 records are included in the automatic substitution result data 225. The NPC information 261 is information for specifying an NPC who is the requester of the game task in the record. The use reward table information 262 is information indicating the aforementioned lottery table to be used in a lottery for selecting an achievement reward of the game task. The automatic substitution day and time 263 is information indicating the day and time at which the automatic execution by the substitute has been conducted. In this example, basically, the automatic substitution day and time 263 is the time of resumption of the game or a game task update timing.

With reference back to FIG. 8, next, the non-activation-time automatic substitution number data 226 is data indicating the number of times of automatic execution by a substitute that could have been conducted while the game has not been started. This data is calculated at the resumption of the game, to be stored. Thereafter, at the timing when the above-described report screen has been confirmed, a process of generating a game task and a reward lottery process are performed said number of times, and rewards are given. Since the upper limit value is set as described above, the actually processed number of times of automatic execution by a substitute conducted while the game has not been started could be smaller than the number of times of automatic execution by a substitute calculated at the resumption of the game.

Next, the last update day and time 227 is information indicating the day and time at which the saved data 215 has been updated last. In this example, the saved data 215 is automatically updated at predetermined timings after the game has been started. Specifically, after a game startup-time process (step S1) described later is performed, until the game play ends (until the player logs out), it is assumed that, for example, at a timing when scene transition in the game has occurred, or at a timing when increase/decrease of items has occurred, information that indicates the game state at that timing and that includes each data such as the possessed item data 221, etc., described above, is transmitted from the smart device 102 to the server, and the saved data 215 is updated by the content of the transmitted information.

Other than these, although not shown, the saved data 215 stores various kinds of data such as image data indicating the appearance and the name of the player character, the current position of the player character in the game world, and friend information.

With reference back to FIG. 7, next, the game task master data 216 is data based on which game tasks are generated. In this example, a plurality of game tasks are defined for each NPC. At the task update timing, a process of determining, for example, at random, which NPCs are to be caused to appear, and further determining which game task out of the plurality of game tasks set for each NPC is to be used, is performed on the basis of the game task master data 216.

Next, data on the smart device side is described. FIG. 11 shows an example of a program and data stored in the memory 113 of the smart device 102. The memory 113 has stored therein a client-side program 281, operation data 282, object data 283, and the like.

The client-side program 281 is a program for causing the smart device 102 to execute various kinds of functions on the smart device side in the game processing according to the exemplary embodiment.

The operation data 282 is data indicating the contents of various kinds of operations performed onto the operation section 115. In the exemplary embodiment, the operation data 282 includes data indicating the presence/absence of an input onto a touch panel serving as the operation section 115, touch coordinates, and the like, and data indicating the pressing states and the like of various kinds of buttons (not shown). The content of the operation data 282 is updated in a predetermined cycle on the basis of a signal from the operation section 115.

The object data 283 is data that defines images, shapes, and the like of various kinds of objects and stages constituting the game world. Image data and the like that indicate the appearances of the aforementioned virtual characters are also included in this data.

Other than these, various kinds of data that are required for the game processing are stored in the memory 113 as appropriate.

[Details of Example of Game Processing]

Figure 12:
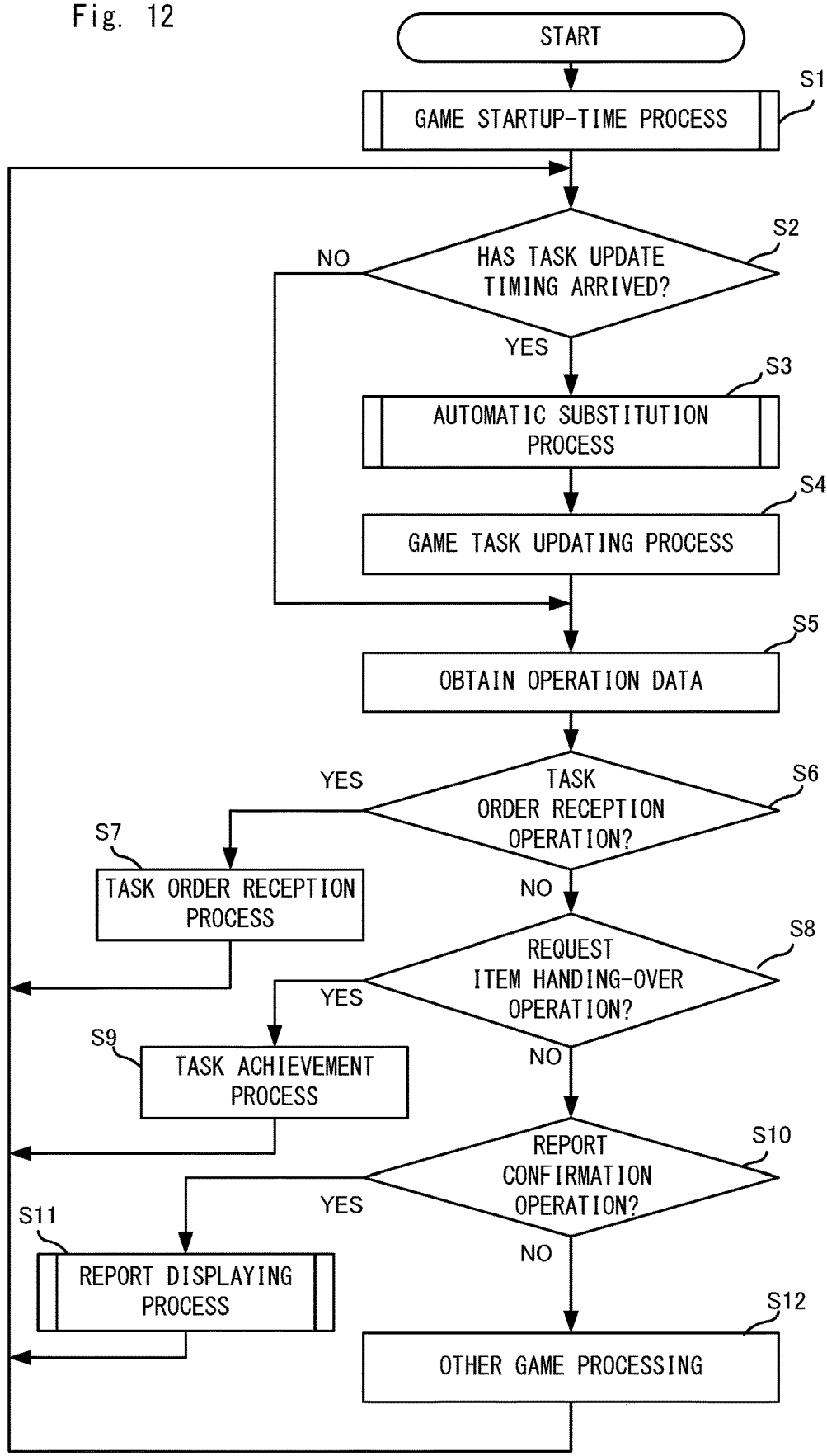
FIG. 12 is a flowchart showing a non-limiting example of details of game processing according to the exemplary embodiment.

Next, with reference a flowchart shown in FIG. 12, details of the game processing according to the exemplary embodiment are described. Here, a process related to a bonus stage is mainly described, and description of the other game processing is omitted. The process below is basically described by using an example case where the processor 111 of the smart device 102 is the main body that performs the process. In another exemplary embodiment, a part of the process described below may be executed by the server 101, and the result may be reflected in the process performed in the smart device 102. For example, in the smart device 102, obtaining of operation data and transmission thereof to the server, and various kinds of image and sound processing may be mainly performed. Then, in the server 101, game processing based on the operation data, such as moving a player object in the virtual game space, or various kinds of determination process, is performed, and the execution result may be transmitted to the smart device 102.

Although the processes performed in the server 101 are not shown, a log-in process, a transmission/reception process of necessary data, and the like are performed as appropriate in accordance with an operation performed by the player (request from the smart device 102).

Figure 13:
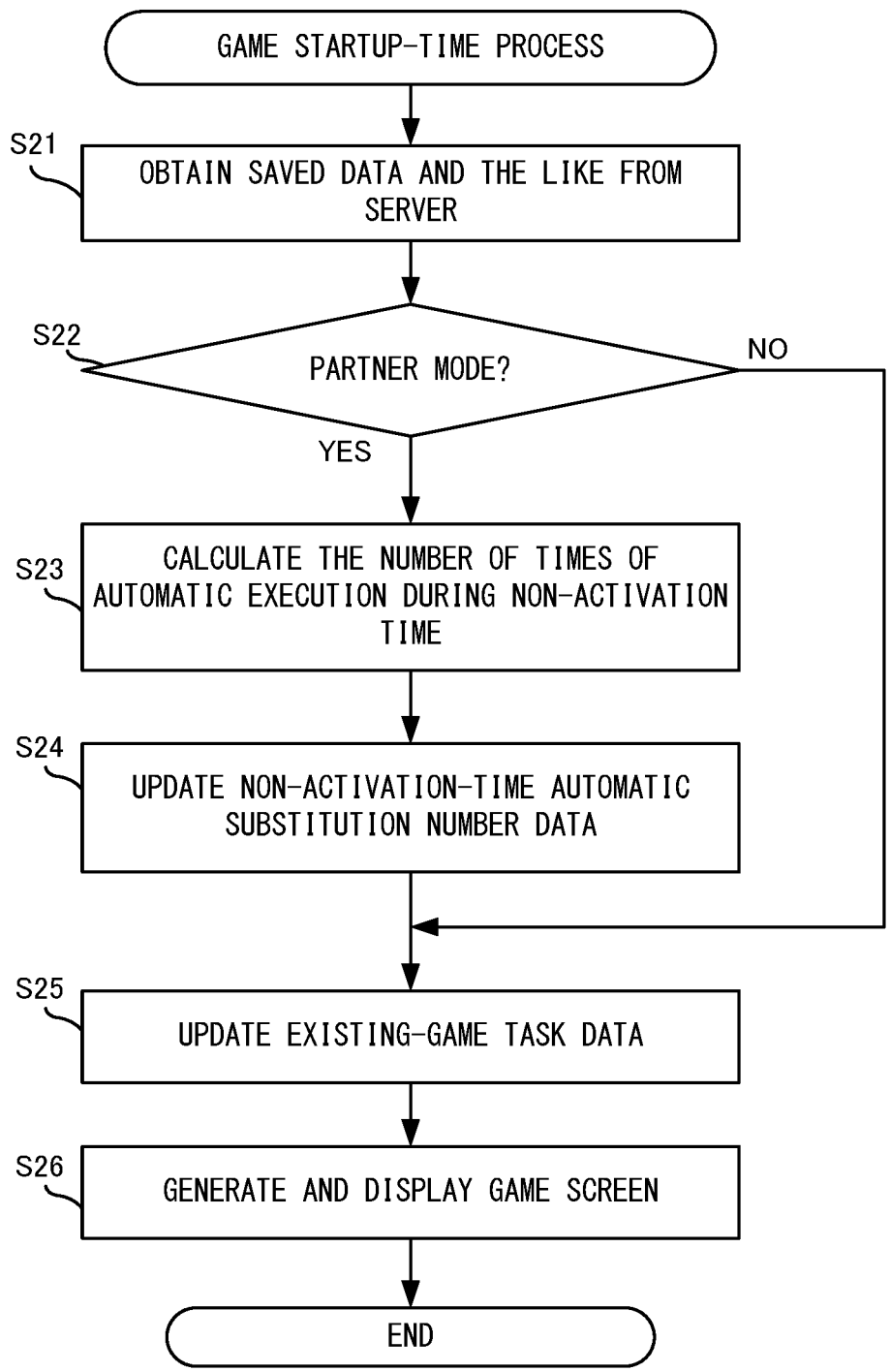
FIG. 13 is a flowchart showing a non-limiting example of details of a startup-time process.

In the smart device 102, when a game startup operation, such as an operation of tapping an icon of the game on a menu screen, is performed by the player, the game processing according to the exemplary embodiment can be started. When the game processing has been started, first, the game startup-time process is executed in step S1. In this process, mainly executed are a log-in process, and a process of calculating (the maximum value of) the number of times of automatic execution by a substitute that could have been conducted while the game has not been started (during log out). FIG. 13 is a flowchart showing details of the game startup-time process. In FIG. 13, first, in step S21, the processor 111 communicates with the server 101, and performs a predetermined log-in process. When the log-in process is successful, the processor 111 obtains, from the server 101, various kinds of data, including the saved data 215, that are to be required for the game processing.

Next, in step S22, the processor 111 determines whether or not the current game state is the partner mode, with reference to the obtained saved data 215. As a result of the determination, when the current game state is not the partner mode (when the current game state is the non-partner mode) (NO in step S22), the process is advanced to step S25 described later.

Meanwhile, when the current game state is the partner mode (YES in step S22), next, in step S23, the processor 111 calculates the number of times of automatic execution by a substitute that could have been conducted while the game has not been started (during log out period). Specifically, the processor 111 calculates how many task update timings are present from the last update day and time 227 (at this time point, the last update day and time 227 indicates the day and time of the immediately preceding log out) to the current time. That is, the number of times of automatic execution by a substitute during the log out period is calculated. In this example, five game tasks occur at a task update timing every three hours. Thus, for example, when the log out period is six hours, it is calculated that ten automatic executions by a substitute can be conducted (ten game tasks can be automatically executed by a substitute).

Next, in step S24, on the basis of the calculated number of times of automatic execution by a substitute, the processor 111 updates the non-activation-time automatic substitution number data 226. Specifically, a process of adding the calculated number of times to the value indicated by the non-activation-time automatic substitution number data 226 is executed. When logging-in and logging-out (i.e., resumption of the game) are performed a plurality of times without receiving rewards, the number of times of automatic execution by a substitute while the game has not been started is also accumulated. Here, the non-activation-time automatic substitution number data 226 itself does not have an upper limit in particular, and the number of times of automatic execution by a substitute that could have been conducted is simply counted. The number of times of automatic execution by a substitute actually considered as such is determined in a report displaying process described later, on the basis of the relationship with the above-described upper limit. For example, even when the number of times of automatic execution by a substitute while the game has not been started is calculated as 50, the number of times considered as that being actually conducted through automatic execution by a substitute is 40 at maximum in this example.

Next, in step S25, the processor 111 performs a process of setting the existing-task data 224. Specifically, a process as below is performed. First, the processor 111 determines whether or not a task update timing has arrived after the immediately preceding log out. When the task update timing has not arrived, the processor 111 does not update the existing-task data 224. That is, the existing-task data 224 stored at the immediately preceding log out is used as is. Meanwhile, when the task update timing has arrived, the processor 111 determines NPCs that will appear and game tasks associated therewith, on the basis of the game task master data 216 obtained from the server 101. Then, the existing-task data 224 is updated by the determined result. Accordingly, game tasks (game tasks that exist at present) that can be recognized by the player during the current play are set.

Next, in step S26, the processor 111 generates a game screen reflecting the above process, and displays the game screen. Thereafter, the processor 111 starts receiving an operation from the player. Then, the game startup-time process ends.

With reference back to FIG. 12, next, in step S2, the processor 111 determines whether or not the above-described task update timing has arrived. As a result, when the task update timing has not arrived (NO in step S2), the process is advanced to step S5 described later. When the task update timing has arrived (YES in step S2), the processor 111 executes an automatic substitution process in step S3. This process is a process for conducting automatic execution by a partner acting as a substitute during the game play.

Figure 14:
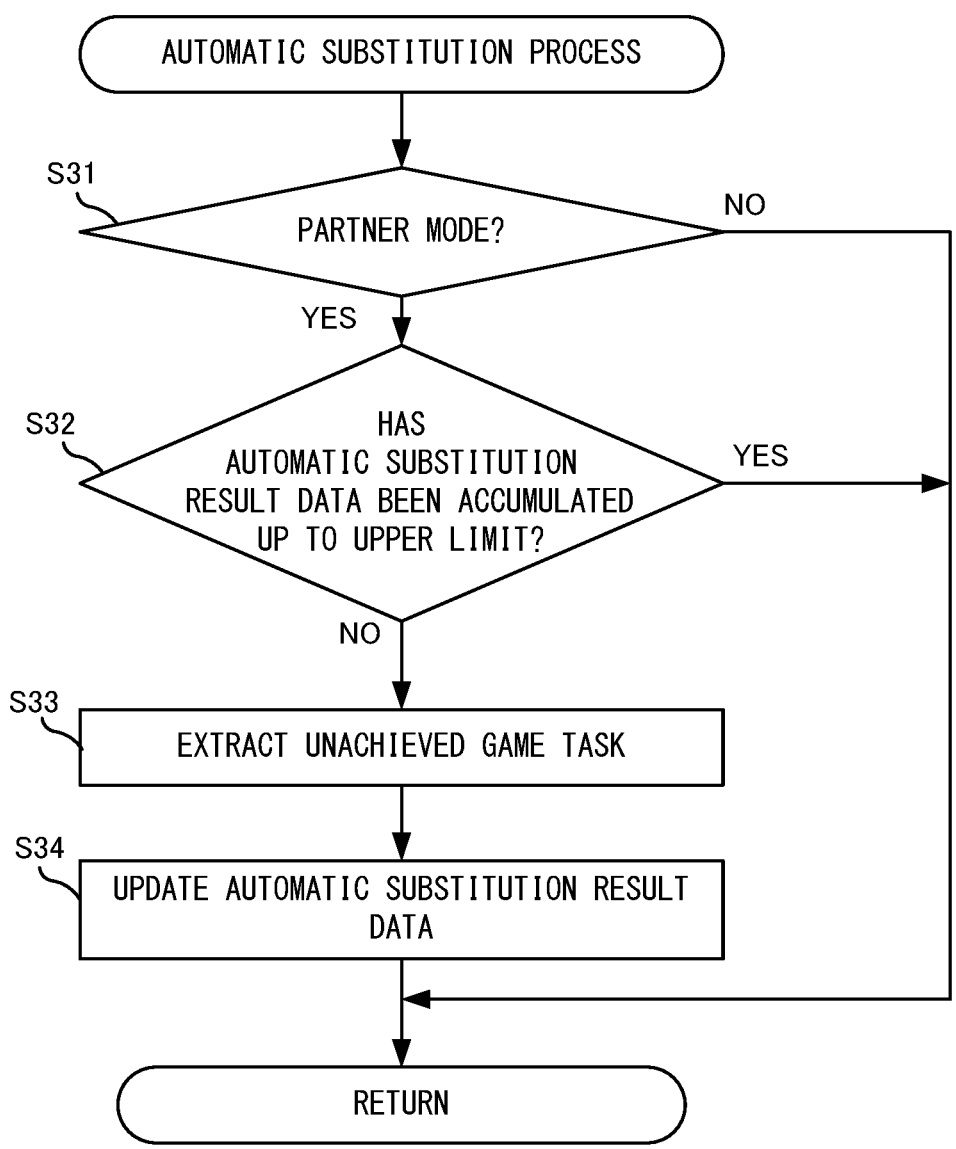
FIG. 14 is a flowchart showing a non-limiting example of details of an automatic substitution process.

FIG. 14 is a flowchart showing details of the automatic substitution process. First, in step S31, with reference to the partner mode information 222, the processor 111 determines whether or not the current game state is the partner mode. When the current game state is not the partner mode (NO in step S31), the automatic substitution process ends. Meanwhile, when the current game state is the partner mode (YES in step S31), the processor 111 determines, in step S32, whether or not the number of pieces of the automatic substitution result data 225 has reached an upper limit. When the upper limit has been reached (YES in step S32), the automatic substitution process ends so that the automatic execution by a substitute is not conducted any more. When the upper limit has not been reached (NO in step S32), a game task of which the progress status is not "achieved" (i.e., unachieved) is extracted in step S33, with reference to the existing-task data 224.

Next, in step S34, on the basis of the NPC information 252 and the achievement reward information 254 of the extracted game task, the processor 111 executes a process of updating the automatic substitution result data 225. Specifically, the processor 111 sets the NPC information 261 and the use reward table information 262 that correspond to the extracted game task, and sets the current day and time as the automatic substitution day and time 263. Accordingly, a state in which: the game task not having been achieved at the task update timing is considered as having been achieved; and the achievement reward thereof has not been received, can be established. Then, the automatic substitution process ends.

With reference back to FIG. 12, next, in step S4, the processor 111 executes a game task updating process. That is, on the basis of the game task master data 216 obtained from the server 101, the processor 111 determines NPCs that will appear and game tasks associated therewith, and updates the existing-task data 224 with the determined content. Accordingly, the game tasks of which orders can be received by the player are changed.

Next, in step S5, the processor 111 obtains the operation data 282. Next, in step S6, the processor 111 determines whether or not the operation content indicated by the operation data 282 is an operation (hereinafter, referred to as "task order reception operation") of receiving an order of a game task of which an order has not been received. As a result, when the operation content is the task order reception operation (YES in step S6), the processor 111 executes a task order reception process in step S7. Specifically, with reference to the existing-task data 224, the processor 111 sets the progress status 253 corresponding to the task of which the order has been received, to "in progress". Further, the processor 111 also executes a process of displaying a representation and the like of receiving the order of the game task. Other than these, various kinds of processes associated with the game task order reception are also executed as appropriate. Then, the process returns to step S2 and is repeated.

Meanwhile, as a result of the determination in step S6, when the operation content is not the task order reception operation (NO in step S6), the processor 111 determines, in step S8, whether or not the above-described request item handing-over operation has been performed. This operation is, for example, a game task in progress, and is an operation of handing over all the request items to the requester NPC. When the request item handing-over operation has been performed (YES in step S8), the processor 111 executes a task achievement process in step S9. Specifically, the processor executes the process as below. First, the processor 111 performs a process of consuming or subtracting the request item of the game task according to the present report, from the possessed item data 221. Further, on the basis of a reward table indicated by the achievement reward information 254, the processor 111 executes a process of performing a lottery for selecting an achievement reward. Then, the processor 111 adds the achievement reward selected through the lottery to the possessed item data 221, thereby giving the achievement reward to the player. Further, the processor 111 sets the corresponding progress status 253 of the game task in the existing-task data 224, to "achieved". Further, the processor 111 performs a process of displaying a predetermined representation indicating that the game task has been achieved. In addition, the processor 111 performs a process of increasing, by a predetermined value, the degree of intimacy with the NPC who is the requester of the game task that has been achieved this time. Then, the process returns to step S2 and is repeated.

Meanwhile, as a result of the determination in step S8, when the operation content is not the request item handing-over operation (NO in step S8), the processor 111 determines, in step S10, whether or not a report confirmation operation has been performed. This operation is, for example, an operation of tapping the partner image 201 performed by the player on the map screen shown in FIG. 4, in a state where there is an achievement reward that can be received. As a result of the determination, when the report confirmation operation has been performed (YES in step S10), the processor 111 executes a report displaying process in step S11. In this process, a process of displaying a result of automatic execution by a substitute by use of the report screen described above, and performing a lottery for selecting an achievement reward to give the achievement reward to the player, is mainly performed.

Figure 15:
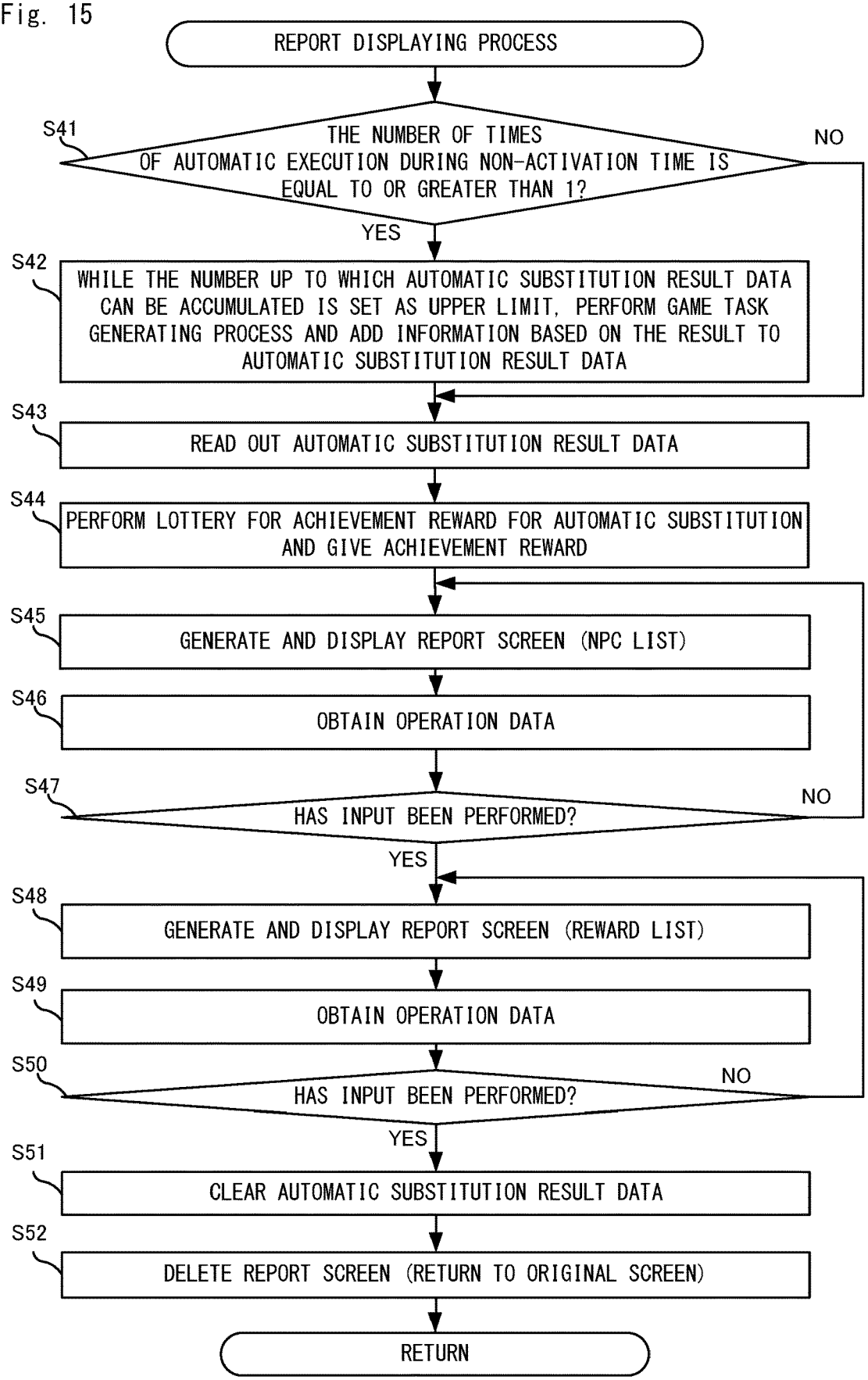
FIG. 15 is a flowchart showing a non-limiting example of details of a report displaying process.

FIG. 15 is a flowchart showing details of the report displaying process. First, in step S41, with reference to the non-activation-time automatic substitution number data 226, the processor 111 determines whether or not the number of times of the automatic substitution is equal to or greater than 1. That is, the processor 111 determines whether or not at least one automatic execution by a substitute has occurred during a log out period. As a result of the determination, when the number of times is less than 1 (i.e., zero) (NO in step S41), the process is advanced to step S43 described later.

Meanwhile, when the number indicated by the non-activation-time automatic substitution number data 226 is equal to or greater than 1 (YES in step S41), the processor 111 executes, in step S42, a process of adding, to the automatic substitution result data 225, information related to automatic execution by a substitute during the time while the game has not been started. Specifically, first, the processor 111 determines whether or not the number of the automatic substitution result data 225 at that time point has reached the upper limit. When the upper limit has been reached, no more automatic execution by a substitute can be conducted, and thus, the processor 111 advances the process to the next step without adding the information to the automatic substitution result data 225. Meanwhile, when the upper limit has not been reached, the processor 111 executes a process of generating game tasks that correspond to the number of times that reaches the upper limit. Specifically, on the basis of the game task master data 216, the processor 111 generates game tasks at random. Then, the processor 111 adds information indicating the generated game tasks to the automatic substitution result data 225. That is, the processor 111 adds the NPC information 261 and the use reward table information 262 related to the generated game tasks to the automatic substitution result data 225. In addition, the current process day and time are set as the automatic substitution day and time 263. This can produce a result that the automatic execution by the partner acting as a substitute has been conducted also while the game has not been started.

Next, in step S43, the processor 111 executes a process of reading out the automatic substitution result data 225. As a result of the process as described above, the automatic substitution result data 225 can include a result of automatic executions by the substitute while the player has been playing the game, and a result of automatic executions by the substitute while the game has not been started (during a log out period).

Next, in step S44, the processor 111 executes a process of performing lotteries for selecting achievement rewards corresponding to automatic executions by the substitute, and giving the achievement rewards to the player. Specifically, the processor 111 performs a lottery for selecting an achievement reward for each game task by using the use reward table information 262 in the automatic substitution result data 225. Then, the processor 111 adds the achievement reward selected through the lottery to the possessed item data 221.

Next, in step S45, on the basis of the automatic substitution result data 225, the processor 111 executes a process of generating a report screen (NPC list) as shown in FIG. 5, and displaying the report screen. Specifically, on the basis of the NPC information 261 in the automatic substitution result data 225, the processor 111 specifies NPCs for which the automatic executions by the substitute have been performed, generates a report screen (NPC list) including face images, etc., thereof, and displays the face images, etc. At this time, the processor 111 may display a game representation indicating that the partner has achieved the game tasks. Then, the processor 111 waits for an operation from the player.

Next, in step S46, the processor 111 obtains the operation data 282, and, in the subsequent step S47, determines whether or not any input operation has been performed, for example, whether or not a tapping operation has been performed on a position in the screen. As a result of the determination, when no input has been performed (NO in step S47), the process returns to step S45 and is repeated. When an input has been performed (YES in step S47), the processor 111 executes, next, in step S48, a process of generating a report screen (reward list) as shown in FIG. 6, and displaying the report screen. Specifically, the processor 111 generates images corresponding to the achievement rewards selected through the lotteries in step S44, further generates a report screen (reward list) using the images, and displays the report screen. Then, the processor 111 waits for an operation from the player.

Next, in step S49, the processor 111 obtains the operation data 282, and, in the subsequent step S50, determines whether or not an input operation has been performed, for example, whether or not a tapping operation has been performed on a position in the screen. As a result of the determination, when no input has been performed (NO in step S50), the process returns to step S48 and is repeated. When an input has been performed (YES in step S50), the processor 111 executes, next, in step S51, a process of clearing the automatic substitution result data 225. That is, a state where the achievement rewards have been received is established. As a result, in the automatic substitution result data 225, information related to game tasks that are achieved thereafter (after the report confirmation operation has been performed this time) will be accumulated.

Next, in step S52, the processor 111 executes a process of deleting the report screen (reward list), ending presentation of the report screen, and transitioning to the original screen (e.g., map screen). Then, the report displaying process ends.

With reference back to FIG. 12, next, as a result of the determination in step S10, when the report confirmation operation has not been performed (NO in step S10), other game processing is executed in step S12. Here, for example, a process as below is executed. First, on the basis of the content indicated by the operation data 282, a process of causing the player character to move in the in-game world, or causing the player character to perform a predetermined action is executed. As a result of this process, when various kinds of items including the above-described request item have been acquired, the content of the possessed item data 221 is also updated as appropriate. When an operation of designating a partner or an operation of dismissing the partner has been performed, the partner mode information 222 and the current partner information 223 are updated on the basis of the operation content. That is, a process of switching between the partner mode and the non-partner mode is performed. When an operation of changing the partner has been performed in the partner mode, a process of changing the partner on the basis of the operation content, and further updating the current partner information 223 as appropriate, is also executed. In addition, a process of determining the presence/absence of a receivable achievement reward and changing the display content of the partner image 201 shown in FIG. 4 (e.g., turning on/off of indication that a receivable reward is present), is also performed. In particular, in the exemplary embodiment, displaying is set such that even when a task update timing has arrived, an indication that a receivable reward is present is not immediately displayed, and at a timing when a transition of an in-game scene has occurred, an indication that a receivable reward is present is displayed. This is to prevent the partner, who is supposed to follow the player character in the game, from being seen as if automatically executing, as a substitute, a game task while the player does not notice. That is, the screen is caused to be viewed as if the partner acting as a substitute has automatically executed during the scene transition, whereby the player is prevented from having a feeling of strangeness. A process of generating a game screen reflecting the various kinds of game processing as described above and displaying the game screen is also executed.

When the process of step S12 ends, the process returns to step S2 and is repeated until a predetermined game ending instruction (logging out operation, etc.) is performed. This is the end of the detailed description of the game processing of the exemplary embodiment.

As described above, in the exemplary embodiment, when there is a game task to be achieved under a condition of consuming an item or the like, and the game task is considered as being achieved by being automatically executed by a partner acting as a substitute, consumption of the item or the like, which is originally an achievement condition, is not performed. That is, although the game task can be achieved without an operation by the player, consumption of an item not intended by the player can be prevented from occurring in association with this achievement. Accordingly, convenience for game task achievement can be increased.

[Modification]

In the above exemplary embodiment, an example in which no item consumption occurs when a partner acting as a substitute automatically executes a game task has been described. However, not limited thereto, a smaller number of items than that would be originally consumed may be consumed. For example, in a case where an original request item is "one apple and three peaches", when the game task is achieved by being automatically executed by the partner acting as a substitute, a smaller number of items, e.g., "one apple and one peach", than the originally requested number of items may be consumed.

The target game tasks to be automatically executed by a substitute may be a part of game tasks that have not been achieved, i.e., that are unachieved, through operations by the player, or may be all of unachieved game tasks (as in the above example).

In the above example, game tasks are updated every three hours. This time period may be determined on the basis of real time, or in-game time that could advance differently from the real time.

In another exemplary embodiment, in a case where game tasks are updated every three hours, for example, a control may be performed every three hours, in which a game task not having been achieved at that time point is automatically executed by a substitute. In this case, for example, as a process on the server side, a process in which a game task not having been achieved is automatically executed by a substitute every three hours, and the automatic substitution result data 225 is updated, may be performed.

In the above example, the report screen is displayed when a tapping operation is performed on the partner image 201. Other than this, in another exemplary embodiment, at a timing when the game is started (resumed), the report screen regarding game tasks for which achievement rewards have not been received at that time point may be displayed. As described above, in a case where game tasks not having been achieved are automatically executed by a substitute every three hours, for example, the player can be caused to receive achievement rewards corresponding to the automatic executions, simply by starting the game. Accordingly, convenience for the player can be further improved.

In the above example, one game task is associated with one NPC. However, in another exemplary embodiment, one NPC may present a plurality of game tasks to the player. For example, five game tasks may be set per NPC. In this case, each NPC may present game tasks one by one in a predetermined order, to the player. For example, the first game task is presented, and when this game task is achieved, the second game task may be presented to the player.

In the above example, a case where the number of NPCs that issue game tasks is five has been described. However, this number is an example. It is understood that the number may be greater or smaller than five or may even be one.

In the above example, when a game task is to be started, an operation of "receive an order" is performed. In another exemplary embodiment, the operation for receiving an order may be omitted. For example, without performing the operation for receiving an order as described above, a game task may be achieved simply by talking to the NPC in a state where request items have already been collected. In this case, at the timing when game tasks are updated, a process in which each game task is considered to have been started may be performed.

In another exemplary embodiment, limited to a case where a partner is set for the first time after the game has been started for the first time, a predetermined game task may be automatically executed by a substitute, and a reward may be given to the player. Accordingly, the function of automatic execution by a partner acting as a substitute can be demonstrated, and thus, the effect of automatic execution by a substitute can be shown to the player in an easily understandable manner.

In another exemplary embodiment, in addition to the above-described automatic execution by the partner acting as a substitute, the partner may be caused to collect items that can be acquired in the game. Then, for example, at the timing of giving the player an achievement reward on the report screen described above, the collected items may be given to the player. For example, a predetermined number of items such as "apple" and "peach" mentioned above may be given to the player.

In the exemplary embodiment, an example in which, when a game task has been achieved, the degree of intimacy with the NPC who is the requester of the game task is changed, has been described. With respect to the degree of intimacy, in another exemplary embodiment, a control as below may be performed. First, with respect to a game task, when the game task has been achieved on the basis of an operation of the player (i.e., without using automatic execution by a substitute), the degree of intimacy with the requester NPC is increased by a first change amount. Meanwhile, when the game task has been achieved by being automatically executed by the partner acting as a substitute, the degree of intimacy with the NPC may be prevented from being changed. Alternatively, the degree of intimacy may be increased by a second change amount that is smaller than the first change amount. This configuration is devised for the following reason. The processing is performed assuming that, in reception of an order of a task or handing over of a request item to an NPC, the player character and the requester NPC directly meet each other and talk with each other. However, if the degree of intimacy is changed even though the player character and the requester NPC do not meet each other, a feeling of strangeness could be caused.

In association with achievement of a game task by the automatic execution by a substitute, the degree of intimacy with the virtual character designated as the partner may be increased. For example, in the displaying process of the report screen, at the timing when a representation indicating that the partner has achieved a game task is displayed, a process of increasing the degree of intimacy with the partner may be performed. Accordingly, when a virtual character with whom the degree of intimacy is wished to be increased in particular is set as a partner, the degree of intimacy can be further easily increased.

In another exemplary embodiment, a condition for designating a partner may be provided. For example, under a condition that the player (character) possesses a predetermined item set for each virtual character, a predetermined virtual character may be set as a partner. In other words, until the predetermined items are all collected, which is the condition, a partner may be prevented from being designated.

The partner may be set under a condition that the player or the player character pays a predetermined consideration. For example, the player subscribes to a predetermined subscription service and pays a predetermined monthly charge, whereby a partner setting right may be made effective. That is, only a player who has paid the monthly charge may be allowed to set a partner.

In the exemplary embodiment, displaying is set such that even when a task update timing has arrived, an indication that a receivable reward is present is not immediately displayed, and at a timing when a transition of an in-game scene has occurred, an indication that a receivable reward is present is displayed. That is, the process itself in which a task not having been achieved is considered as having been achieved is performed at a task update timing. In this regard, in another exemplary embodiment, after a task update timing has arrived, at a timing when a transition of an in-game scene has occurred, a process in which the partner acting as a substitute performs a task that has not been achieved before the update (a process of considering the task has been achieved) may be performed.

In the above example, when achievement rewards (the automatic substitution result data 225) have accumulated up to the upper limit, no more automatic execution by a substitute can be performed. In another exemplary embodiment, even in such a case, older achievement rewards are deleted in sequential order, whereby automatic executions by a substitute may be allowed. In this case, the newest data (up to the upper limit number) is always stored.

In the above example, one NPC is set as a partner. However, in another exemplary embodiment, a plurality of NPCs may be set as partners. Then, a control in which the plurality of partners acting as substitutes automatically and separately execute unachieved game tasks may be performed.

In the exemplary embodiment, an example in which the server 101 and the smart device 102 perform game processing in cooperation with each other has been described. However, in another exemplary embodiment, the game processing as described above may be performed only by the smart device 102. That is, the game processing may be performed in a so-called stand-alone form, in which the above-described various kinds of data stored in the server 101 are stored in the smart device 102, and the above-described processes are completed only by the smart device 102.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A computer readable non-transitory storage medium having stored therein an information processing program to be executed by a computer of an information processing apparatus, the information processing program configured to cause the computer to:
    track a plurality of virtual items that are different items that are obtainable within a virtual world of a video game, the plurality of virtual items including a first virtual item that is marked as being possessed by a player of the video or a player character of the video game;
    track, as part of the video game, a plurality of tasks that are performable within the virtual world of the video game, each one of the plurality of task having an associated progress state, a corresponding achievement condition, and being associated with a corresponding one of a plurality of non-player controlled characters located within the virtual world of the video game, the plurality of tasks includes a first task in which progress towards the corresponding achievement condition for the first task is achieved by handing over the first virtual item to the corresponding one of the plurality of non-player controlled characters that is associated with the first task;
    switch a state of the video game between a first mode and a second mode on the basis of a switching input by the player;
    in a case where the state of the video game is in the first mode:
        receiving an operation input from the player to control a virtual character to hand over the first virtual item to the corresponding non-player character that is associated with the first task,
        based on the handing over of the first virtual item, perform a first achievement determination of whether the first task has been achieved, under a condition that a number of the first item possessed is changed by a first change amount;
    designate a first non-player character out of the plurality of the non-player characters;
    in a case where the state of the video game is in the second mode:
        automatically, without relying upon operation inputs from the player and even while the video game is not being played by the player, perform a second achievement determination of whether the first task has been achieved, under a condition that the number of the first item possessed by the player is not changed or the number of the item possessed is changed by a second change amount that is smaller than the first change amount; and
    execute, based on determination that the first task has been achieved via the second achievement determination, an in-game representation that indicates that the designated first non-player character has achieved the first task instead of the player of the player character.

2. The storage medium according to claim 1, wherein in performance of the second achievement determination, among the plurality of tasks that are able to be determined as having been achieved in the first achievement determination or performance of the second achievement determination, a task that has not been determined as having been achieved in performance of the first achievement determination, is determined as having been achieved.

3. The storage medium according to claim 1, wherein in performance of the second achievement determination, among the plurality of tasks that are able to be determined as having been achieved in performance of the first achievement determination or performance of the second achievement determination, all of the plurality of tasks that have not been determined as having been achieved in performance of the first achievement determination, are determined as having been achieved.

4. The storage medium according to claim 1, wherein the first task is updated in accordance with a lapse of in-game time or a lapse of real time.

5. The storage medium according to claim 4, wherein in performance of the second achievement determination, in accordance with a fact that update of the first task has been performed, the first task before the update is determined as having been achieved.

6. The storage medium according to claim 1, wherein in performance of the second achievement determination, at a time of start of the game, those tasks of which the number corresponds to a lapse of real time after playing of the game has been ended in an immediately preceding time are determined as having been achieved.

7. The storage medium according to claim 1, wherein the information processing program further causes the computer to:
designate at least one non-player character out of a plurality of the non-player characters;
execute a game representation indicating that the designated non-player character achieves the first task instead of the player or the player character; and
set, in state management of for plurality of tasks, a corresponding task so as to be associated with each non-player character excluding the designated non-player character.

8. The storage medium according to claim 7, wherein in performance of the second achievement determination, when designation of the non-player character has been performed for the first time, that at least one of the plurality of tasks has been achieved in accordance with the designation is determined, and
in the execution of the game representation, the game representation for the first task having been achieved in accordance with the designation made for the first time is executed.

9. The storage medium according to claim 7, wherein under a condition that the player or the player character possesses a specific item, a non-player character corresponding to the specific item is allowed to be designated.

10. The storage medium according to claim 1, wherein the information processing program further causes awarding, to the player or the player character, a reward based on achievement of the first task.

11. The storage medium according to claim 10, wherein based on awarding if the reward, an item obtainable in the game by the player or the player character at a time point of giving the reward based on the first task being achieved in accordance with performance of the second achievement determination, is further given to the player or the player character.

12. The storage medium according to claim 5, wherein in performance of the second achievement determination, in a case where the state of the game is in the second mode, and update of the first task has been performed while the game is played by the player, the first task is determined as having been achieved, when transition of a screen of the game is performed after the update.

13. The storage medium according to claim 1, wherein the information processing program further causes the computer to generate, on the basis of a confirmation operation input by the player, an image that allows confirmation of the first task achieved after the confirmation operation input has been performed at an immediately preceding time.

14. The storage medium according to claim 13, wherein in state management of the plurality of tasks, each one of the plurality of tasks is updated in accordance with a lapse of in-game time or a lapse of real time, and
in performance of the second achievement determination, when the first task has been updated in a state where the confirmation operation input for confirming the first task achieved has not been performed, the first task is, also with respect to the first task that has been updated, determined as having been achieved, under a condition that the number of the item possessed is not changed or the number of the item possessed is changed by the second change amount that is smaller than the first change amount.

15. The storage medium according to claim 14, wherein in performance of the second achievement determination,
(a) a process of determining that, when the first task has been updated in a state where the confirmation operation input has not been performed, the first task that has been updated has been achieved, is repeatedly executed, with a predetermined number of times set as an upper limit number of times, and
(b) a count of the number of times of execution of the determination is reset in accordance with a fact that the confirmation operation input has been performed.

16. The storage medium according to claim 1, wherein the information processing program further causes the computer to,
when the first task has been determined as having been achieved in the performance of first achievement determination, to change, by a third change amount, a non-parameter that corresponds to the non-player character associated with the first task, and
when the first task has been determined as having been achieved in performance of the second achievement determination, not to change the non-player-related parameter, or to change the non-player-related parameter by a fourth change amount that is smaller than the third change amount.

17. The storage medium according to claim 16, wherein the information processing program further causes the computer to:
designate at least one non-player character out of a plurality of the non-player characters;
execute a game representation indicating that the designated non-player character achieves the first task instead of the player or the player character; and
change, when the first task has been determined as having been achieved in performance of the second achievement determination, the non-player-related parameter associated with the designated non-player character.

18. The storage medium according to claim 1, wherein the state according to the first mode is a standard state of the game, and under a condition that the player or the player character pays a consideration, the first mode is switched to the second mode.

19. The storage medium according to claim 18, wherein under a condition that a right that has become effective as a result of the player or the player character paying a consideration is valid, the first mode is switched to the second mode.

20. An information processing apparatus comprising at least one processor, the at least one processor configured to:
track a plurality of virtual items that are different items that are obtainable within a virtual world of a video game, the plurality of virtual items including a first virtual item that is marked as being possessed by a player of the video or a player character of the video game;
track, as part of the video game, a plurality of tasks that are performable within the virtual world of the video game, each one of the plurality of tasks having an associated progress state, a corresponding achievement condition, and being associated with a corresponding one of a plurality of non-player controlled characters located within the virtual world of the video game, the plurality of tasks includes a first task in which progress towards the corresponding achievement condition for the first task is achieved by handing over the first virtual item to the corresponding one of the plurality of non-player controlled characters that is associated with the first task;
switch a state of the video game between a first mode and a second mode on the basis of a switching input by the player;
in a case where the state of the video game is in the first mode:
receiving an operation input from the player to control a virtual character to hand over the first virtual item to the corresponding non-player character that is associated with the first task, and
based on the handing over of the first virtual item, perform a first achievement determination of whether the first task has been achieved, under a condition that a number of the first item possessed is changed by a first change amount;
designate a first non-player character out the plurality of the non-player characters; and
in a case where the state of the game is in the second mode:
automatically, without relying upon operation inputs from the player and even while the video game is not being played by the player, perform a second achievement determination of whether the first task has been achieved, under a condition that the number of the first item possessed by the player is not changed on the number of the item possessed is changed by a second change amount that is smaller than the first change amount, and
execute, based on determination that the first task has been achieved via the second achievement determination, an in-game representation that indicates that the designated first non-player character has achieved the first task instead of the player or the player character.

21. An information processing system comprising:
at least one hardware processor and memory storing computer executable instructions that are configured to cause the at least one hardware processor, when executed by the at least one hardware processor, to perform operations comprising:
tracking a plurality of virtual items that are different items that are obtainable within a virtual world of a video game, the plurality of virtual items including a first virtual item that is marked as being possessed by a player of the video or a player character of the video game;
tracking, a s part of the video game, a plurality of tasks having an associated progress virtual world of the video game, each one of the plurality of tasks having an associated progress state, a corresponding achievement condition, and being associated with a corresponding one of a plurality of non-player controlled character located within the virtual world of the video game, the plurality of tasks includes a first task in which progress towards the corresponding achievement condition for the first task is achieved by handing over the first virtual item to the corresponding one of the plurality of non-player controlled characters that is associated with the first task;
switching a state of the video game between a first mode and a second mode on the basis of a switching input by the player;
in a case where the state of the video game is in the first mode:
receive an operation input from the player to control a virtual character to hand over the first virtual item to the corresponding non-player character that is associated with the first task,
based on the handing over of the first virtual item, performing a first achievement determination of whether the first task has been achieved, under a condition that a number of the first item possessed is changed by a first change amount;
designating a first non-player character out of the plurality of the non-player characters;
in a case where the state of the video game is in the second mode;
automatically, without relying upon operation inputs from the player and even while the video game is not being played by the player, performing a second achievement determination of whether the first task has been achieved, under a condition that the number of the first item possessed by the player is not changed or the number of the item possessed is changed by a second change amount that is smaller than the first changed amount; and
executing, based on determination that the first task has been achieved via the second achievement determination, an in-game representation that indicates that the designated first non-player character has achieved the first task instead of the player or the player character.

22. An information processing method that is executed by a computer controlling an information processing apparatus, the information processing method comprising:
tracking a plurality of virtual items that are different items that are obtainable within a virtual world of a video game, the plurality of virtual items including a first virtual item that is marked as being possessed by a player of the video or a player character of the video game;
tracking, as part of the video game, a plurality of tasks that are performable with in the virtual world of the video game, each one of the plurality of tasks having an associated progress state, a corresponding achievement condition, and being associated with a corresponding one of a plurality of non-player controlled characters located with the virtual world of the video game, the plurality of tasks includes a first task in which progress towards the corresponding achievement condition for the first task is achieved by handing over the first virtual item to the corresponding one of the plurality of non-player controlled characters that is associated with the first task;

switching a state of the video game between a first mode and a second mode on the basis of a switching input by the player;

in a case where the state of the video game is in the first mode;

receiving an operation input from the player to control a virtual character to hand over the first virtual item to the corresponding non-player character that is associated with the first task, based on the handing over of the first virtual item, performing a first achievement determination of whether the first task has been achieved, under a condition that a number of the first item possessed is changed by a first change amount;

designating a first non-player character out the plurality of the non-player characters;

in a case where the state of the video games is in the second mode:

automatically, without relying upon operation inputs from the player and even while the video game is not being played by the player, performing a second achievement determination of whether the first task has been achieved, under a condition that the number of the first item possessed by the player is not changed or the number of the item possessed is changed by a second change amount that is smaller than the first change amount; and executing, based on determination that the first task has been achieved via the second achievement determination, an in-game representation that indicates that the designated first non-player character has achieved the first task instead of the player or the player character.

* * * * *